(12) United States Patent
Kim et al.

(10) Patent No.: US 11,139,937 B2
(45) Date of Patent: Oct. 5, 2021

(54) UPLINK CONTROL INFORMATION TRANSMISSION METHOD AND DEVICE

(71) Applicant: ELECTRONICS AND TELECOMMUNICATIONS RESEARCH INSTITUTE, Daejeon (KR)

(72) Inventors: Cheul Soon Kim, Daejeon (KR); Jun Hwan Lee, Seoul (KR); Jung Hoon Lee, Daejeon (KR); Ji Hyung Kim, Daejeon (KR); Sung Hyun Moon, Daejeon (KR); Ju Ho Park, Daejeon (KR); Tae Joong Kim, Daejeon (KR); Min Hyun Kim, Busan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/475,828

(22) PCT Filed: Jan. 4, 2018

(86) PCT No.: PCT/KR2018/000154
§ 371 (c)(1),
(2) Date: Jul. 3, 2019

(87) PCT Pub. No.: WO2018/128401
PCT Pub. Date: Jul. 12, 2018

(65) Prior Publication Data
US 2019/0356446 A1    Nov. 21, 2019

(30) Foreign Application Priority Data

Jan. 6, 2017 (KR) .................. 10-2017-0002601
Feb. 6, 2017 (KR) .................. 10-2017-0016434

(Continued)

(51) Int. Cl.
*H04L 5/00* (2006.01)
*H04W 72/04* (2009.01)

(52) U.S. Cl.
CPC ....... *H04L 5/0051* (2013.01); *H04W 72/0453* (2013.01)

(58) Field of Classification Search
CPC ....... H04L 5/0051–0057; H04L 5/0092; H04L 5/0094; H04W 72/042; H04W 72/0446; H04W 72/0453; H04W 72/1289
See application file for complete search history.

(56) References Cited

U.S. PATENT DOCUMENTS 8,831,042 B2    9/2014    Kim et al.
9,680,619 B2    6/2017    Ro et al.
(Continued)

FOREIGN PATENT DOCUMENTS

| KR | 10-2008-0054164 A | 6/2008 |
|---|---|---|
| WO | 2015/115804 A1 | 8/2015 |
| WO | 2016/117929 A1 | 7/2016 |

OTHER PUBLICATIONS

InterDigital Communications, "Scheduling and support for service multiplexing", R1-1612316, 3GPP TSG-RAN WG1 Meeting #87, Reno, USA, pp. 1-6, Nov. 5, 2016; Intl Search Report.

*Primary Examiner* — Pao Sinkantarakorn
(74) *Attorney, Agent, or Firm* — Rabin & Berdo, P.C.

(57) ABSTRACT

The present invention relates to an uplink control information transmission method and device which can improve channel estimation performance of a base station. A terminal operation method for transmitting uplink control information to a base station, according to an embodiment of the present invention, comprises the steps of: receiving, from the base station, resource location information for transmission of a UCI channel; mapping UCI to at least one symbol on the basis of the resource location information, and (Continued)

mapping a reference signal in consideration of frequency selectivity characteristics and time selectivity characteristics of a wireless channel; and transmitting, to the base station, a subframe including the at least one symbol.

6 Claims, 17 Drawing Sheets

(30) Foreign Application Priority Data

| | | |
|---|---|---|
| Mar. 24, 2017 | (KR) | 10-2017-0037910 |
| May 4, 2017 | (KR) | 10-2017-0057003 |
| Jun. 16, 2017 | (KR) | 10-2017-0076925 |
| Jul. 25, 2017 | (KR) | 10-2017-0094422 |
| Aug. 11, 2017 | (KR) | 10-2017-0102630 |
| Nov. 3, 2017 | (KR) | 10-2017-0146057 |
| Nov. 17, 2017 | (KR) | 10-2017-0154228 |
| Dec. 28, 2017 | (KR) | 10-2017-0181997 |

(56) References Cited

U.S. PATENT DOCUMENTS

| | | |
|---|---|---|
| 2010/0014481 A1 | 1/2010 | Ko et al. |
| 2011/0090854 A1 | 4/2011 | Montojo et al. |
| 2014/0036810 A1* | 2/2014 | Harrison ............ H04W 72/042 370/329 |
| 2015/0180638 A1 | 6/2015 | Lee et al. |
| 2016/0270114 A1 | 9/2016 | Dinan |
| 2019/0215824 A1* | 7/2019 | Takeda ................ H04L 5/0007 |
| 2020/0228289 A1* | 7/2020 | He ...................... H04L 5/0055 |

* cited by examiner

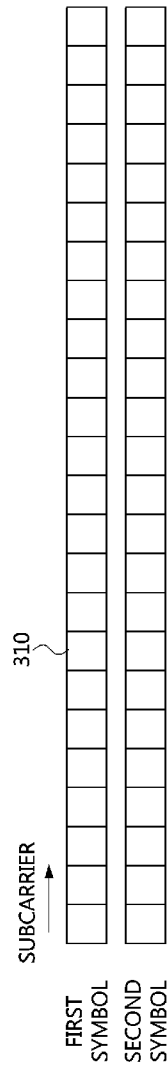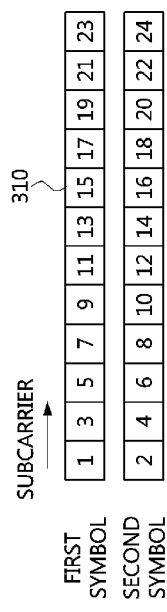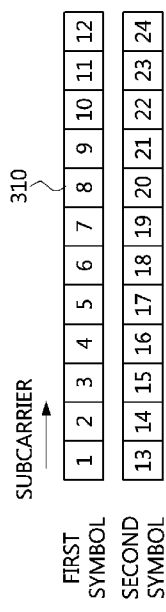

UPLINK CONTROL INFORMATION TRANSMISSION METHOD AND DEVICE

TECHNICAL FIELD

The present invention relates to uplink control information in a wireless communication system, and more particularly, to a method and an apparatus for transmitting uplink control information, which can enhance channel estimation performance in a base station.

BACKGROUND ART

In a general wireless communication system, information transmitted from a terminal to a base station is referred to as uplink (UL) control information (UCI). Examples of such the UCI include a scheduling request, a downlink (DL) channel quality indicator, and an acknowledgment for downlink data, which the terminal transmits to the base station.

Since a new radio (NR) communication system supports dynamic time division duplex (TDD), beam-centric communications, or low-latency communications, the number of UL symbols allowed for the terminal to use to transmit the UCI may be variable and limited.

As an example of the case where the number of UL symbols is variable, the number of UL symbols may be indicated to the terminal by a higher layer signaling of the base station. Alternatively, the number of UL symbols may be indicated to the terminal by a combination of scheduling information and the higher layer signaling of the base station.

As an example of the case where the number of UL symbols is limited, the number of UL symbols may be limited to a small number such that the base station operating in the TDD mode effectively supports DL traffic in the corresponding slot. Therefore, in the NR communication system, a physical channel for transmitting the UCI may have a variable time-domain resource, and is required to be operable based on the small amount of the time domain resource.

DISCLOSURE

Technical Problem

In order to solve the above-described problems, the present invention is directed to providing a method and an apparatus for transmitting UCI, in which a terminal is capable of varying time resources for transmitting the UCI and capable of transmitting the UCI by using a small amount of time resources.

In order to solve the above-described problems, the present invention is directed to providing a method and an apparatus for transmitting UCI, in which a terminal maps HARQ-ACK bits to resource elements (REs) without using reference signals (RSs) when transmitting a UCI channel, thereby reducing detection errors of the UCI channel at a base station.

In order to solve the above-described problems, the present invention is directed to providing a method and an apparatus for transmitting UCI, in which a terminal uses RSs and allows a first symbol and a second symbol to have different subcarrier index sets, thereby enhancing detection performance of the UCI channel at a base station.

In order to solve the above-described problems, the present invention is directed to providing a method and an apparatus for transmitting UCI, in which a base station configures a sounding reference signal (SRS) to be transmitted in the same subband with a UCI channel carrying a scheduling request (SR) by applying a transmission comb (TC) to the UCI channel, when a first terminal transmits the UCI channel and a second terminal transmits the SRS, thereby preventing collisions between the UCI channel and the SRS.

In order to solve the above-described problems, the present invention is directed to providing a method and an apparatus for transmitting UCI, in which a terminal repeatedly transmits an SRS by using the same resource (frequency and code) during two symbols, thereby enhancing channel estimation performance at a base station.

In order to solve the above-described problems, the present invention is directed to providing a method and an apparatus for transmitting UCI, in which a terminal repeatedly transmits an SRS by using different resources (frequency and code) during two symbols, thereby reducing a time required for a base station to obtain channel state information (CSI).

In order to solve the above-described problems, the present invention is directed to providing a method and an apparatus for transmitting UCI, in which uplink management is performed between a terminal and a base station by applying an SRS occasion, thereby performing the uplink management without uplink disconnection even in an environment having a high blockage probability.

In order to solve the above-described problems, the present invention is directed to providing a method and an apparatus for transmitting UCI, in which a base station allocates frequency resources to be used by terminals from boundaries, and a terminal transmit an uplink data channel in a DFT-s-OFDM waveform, thereby allowing a lot of data to be transmitted using a wide bandwidth.

In order to solve the above-described problems, the present invention is directed to providing a method and an apparatus for transmitting UCI, in which a terminal located near from a base station transmits an SRS in a wide band, thereby reducing a time required for a base station to obtain a CSI.

In order to solve the above-described problems, the present invention is directed to providing a method and an apparatus for transmitting UCI, in which a base station makes center frequencies of terminals coincide with each other, and a terminal transmit an uplink data channel in a CP-OFDM waveform, thereby enabling further flexible resource allocation.

Technical Solution

An operation method of a terminal according to an embodiment to achieve the above-described objective, as an operation method of a terminal for transmitting uplink control information (UCI) to a base station, may comprise receiving, from the base station, resource location information for transmission of a UCI channel; mapping the UCI to at least one symbol based on the resource location information, and mapping a reference signal in consideration of frequency selectivity characteristics and time selectivity characteristics of a radio channel; and transmitting, to the base station, a subframe including the at least one symbol.

In the mapping of the reference signal, the reference signal may be mapped to all subcarriers of one symbol in consideration of the frequency selectivity characteristics.

In the mapping of the reference signal, the reference signal may be evenly mapped to subcarriers of a plurality of symbols in consideration of the time selectivity characteristics.

In the mapping of the UCI, the resource location information may include position information of time resources and position information of frequency resources for the transmission of the UCI channel, and the UCI may be mapped in order of the time resources, and then mapped in order of the frequency resources.

In the mapping of the UCI, the resource location information may include position information of time resources and position information of frequency resources for the transmission of the UCI channel, and the UCI may be mapped in order of the frequency resources, and then mapped in order of the time resources.

The position information of the time resources may indicate at least one sub-slot each of which comprises at least one symbol.

The position information of the frequency resources may be generated based on a transmission comb (TC) value, a bandwidth configuration variable, a frequency hopping bandwidth variable, and a frequency domain position information.

The resource location information may be received from the base station as included in a downlink control information (DCI).

The resource location information may be received from the base station through a radio resource control (RRC) signaling.

The resource location information may be received from the base station through a bit field included in a downlink control channel.

An operation method of a terminal according to an embodiment to achieve the above-described objective, as an operation method of a terminal for transmitting uplink control information (UCI) to a base station, may comprise receiving, from the base station, a scheduling request resource for each of a plurality of service types; selecting a service type desired to be provided among the plurality of service types; mapping the UCI and a reference signal for the selected service type to the scheduling request resource allocated by the base station; and transmitting a subframe including the UCI and the reference signal to the base station.

In the receiving of the scheduling request resource, a scheduling request resource for each of an enhanced mobile broadband (eMBB) service, an ultra-reliable low-latency communication (URLLC) service, and a massive machine type communication (mMTC) service may be received.

In the mapping to the scheduling request resource, the UCI and the reference signal of the service type selected among the eMBB service, the URLLC service, and the mMTC service may be mapped to the scheduling request resource.

The scheduling request resource may indicate each of a plurality of sub-slots allocated to different frequency resources, each of the plurality of sub-slots may comprise a plurality of symbols, and in the mapping to the scheduling request resource, the UCI and the RS may be mapped to the plurality of sub-slots so as to have different frequency resource positions.

A terminal according to an embodiment to achieve the above-described objective, as a terminal for transmitting uplink control information (UCI) to a base station, may comprise a memory storing at least one program instruction, a processor executing the at least one program instruction, and a transceiver performing communications as connected to a network. The at least one program instruction may be configured to receive, from the base station, resource location information for transmission of a UCI channel; map the UCI to at least one symbol based on the resource location information, and map a reference signal in consideration of frequency selectivity characteristics and time selectivity characteristics of a radio channel; and transmit, to the base station, a subframe including the at least one symbol.

The at least one instruction may be further configured to map the reference signal to all subcarriers of one symbol in consideration of the frequency selectivity characteristics, or map the reference signal evenly to subcarriers of a plurality of symbols in consideration of the time selectivity characteristics.

The at least one instruction may be further configured to map the UCI to resource elements in order of time resources included in the resource location information and then map the UCI to resource elements in order of frequency resources included in the resource location information, or configured to map the UCI to resource elements in order of the frequency resources included in the resource location information and then map the UCI to resource elements in order of the time resources included in the resource location information.

The at least one instruction may be further configured to receive the resource location information from the base station as included in a downlink control information (DCI).

The at least one instruction may be further configured to receive the resource location information from the base station through a radio resource control (RRC) signaling.

The at least one instruction may be further configured to receive the resource location information from the base station through a bit field included in a downlink control channel.

Advantageous Effects

According to the present invention, the terminal can vary time resources for transmitting the UCI, and the terminal can transmit the UCI by using a small amount of time resources.

According to the present invention, the terminal can map HARQ-ACK bits to REs without using RSs when transmitting the UCI channel, thereby reducing detection errors of the UCI channel at the base station.

According to the present invention, the terminal can use RSs and allow a first symbol and a second symbol to have different subcarrier index sets, thereby enhancing detection performance of the UCI channel at the base station.

According to the present invention, the base station can configure an SRS to be transmitted in the same subband with a UCI channel carrying an SR, and prevent collisions between the UCI channel and the SRS by applying a transmission comb (TC) to the UCI channel, when a first terminal transmits the UCI channel and a second terminal transmits the SRS.

According to the present invention, the terminal can repeatedly transmit an SRS by using the same resource (frequency and code) during two symbols to the base station, thereby enhancing channel estimation performance of the base station.

According to the present invention, the terminal can repeatedly transmit an SRS by using different resources (frequency and code) during two symbols, thereby reducing a time required for the base station to obtain the CSI.

According to the present invention, uplink management can be performed between the terminal and the base station by applying an SRS occasion, thereby performing the uplink management without uplink disconnection even in an environment having a high blockage probability.

According to the present invention, the base station may allocate frequency resources to be used by terminals from edges, and the terminal can transmit an uplink data channel in a DFT-s-OFDM waveform, thereby allowing a lot of data to be transmitted using a wide bandwidth. Also, the terminal located near the base station can transmit an SRS in a wide band, thereby reducing a time required for the base station to obtain the CSI.

According to the present invention, the base station can make center frequencies of terminals coincide with each other, and the terminal can transmit an uplink data channel in a CP-OFDM waveform, thereby lowering Peak to Average Power Ratio (PAPR).

DESCRIPTION OF DRAWINGS

FIG. 3 is a diagram illustrating resource elements to which a UCI channel is allocated or a UCI channel and RSs are allocated;

FIG. 4 is a diagram illustrating an example of mapping 2 symbols and 12 subcarriers;

FIG. 5 is a diagram illustrating another example of mapping 2 symbols and 12 subcarriers;

MODES OF THE INVENTION

Figure 1:
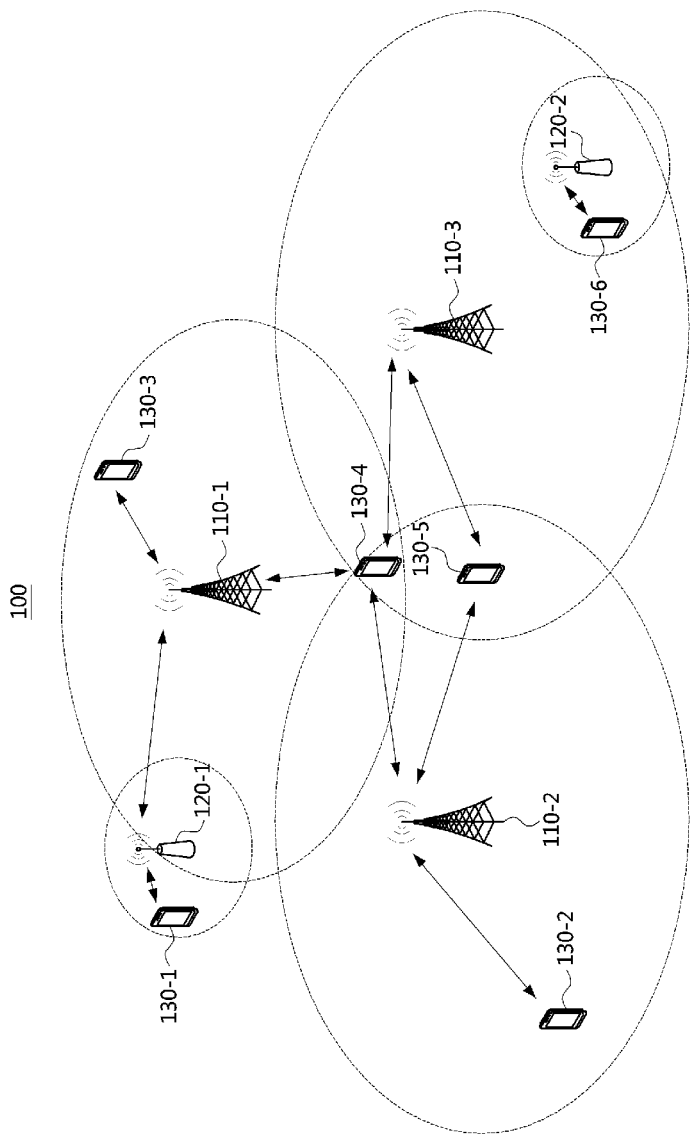
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Throughout the entire specification, a terminal may refer to a mobile station (MS), a mobile terminal (MT), an advanced mobile station (AMS), a high reliability mobile station (HR-MS), a subscriber station (SS), a portable subscriber station (PSS), an access terminal (AT), a user equipment (UE), a machine type communication (MTC) device, or the like, and may include all or some functions of the MT, MS, AMS, HR-MS, SS, PSS, AT, UE, or the like.

Also, a base station may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) performing a role of base station, a relay node (RN) performing a role of base station, an advanced relay station (ARS) performing a role of base station, a high reliability relay station (HR-RS) performing a role of base station, a small base station (a femto base station, a home node B (HNB), a home eNodeB (HeNB), a pico base station, or the like), a macro base station, a micro base station, or the like, and may include all or some functions of the ABS, node B, eNodeB, AP, RAS, BTS, MMR-BS, RS, RN, ARS, HR-RS, small base station, or the like.

The base station may configure one or more cells, and the terminal may establish an RRC connection with at least one cell of the corresponding base station. Here, a cell having the RRC connection may be referred to as a serving cell for the terminal.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system 100 may also be referred to as a 'communication network'. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Each of the plurality of communication nodes may have the following structure.

Figure 2:
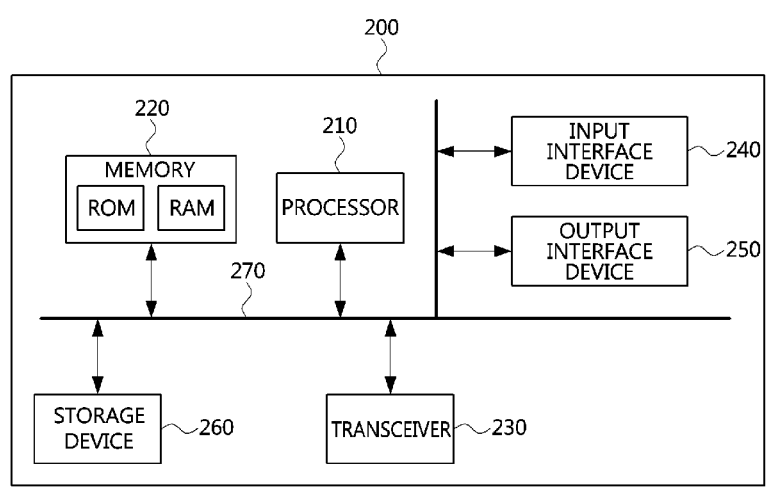
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

The new radio (NR) communication system may operate one or more carriers to configure a Dual Connectivity (DC) and a Carrier Aggregation (CA) for the terminal. In order to support these, a physical channel for transmitting an uplink (UL) HARQ-ACK when a single carrier is configured, and a physical channel for transmitting a UL HARQ-ACK when the DC or CA is configured may be used.

In the NR communication system, a base station (BS) may encode one transport block as a unit, and this may be referred to as a codeword (CW). The base station may transmit the CW to the terminal, and the terminal may receive the CW from the base station. The terminal may generate one HARQ-ACK bit for each CW or codeblock group (CBg). Here, when the base station transmits data using a Multiple Input Multiple Output (MIMO) scheme, the base station may transmit one or two CWs to the terminal according to a channel state. Alternatively, the base station may configure at least one CBg including one or two CWs, and may transmit the configured at least one CBg to the terminal.

When the base station configures a single carrier to the terminal, the terminal may generate 1 bit or 2 bits of HARQ-ACK. Also, when the base station configures a plurality of carriers to the terminal, the terminal may channel-encode HARQ-ACK bits to generate feedback bits. The terminal may transmit the UL HARQ-ACK in a time resource indicated by a UL signaling or a combination of UL signaling and scheduling from the base station. The UL time resource indicated by the base station to the terminal may include a slot index, a sub-slot index, a symbol index, or the like.

The UL control channel transmitted by the terminal may occupy at least one symbol according to a combination of a higher layer configuration and a DL control channel for scheduling downlink data. Such the consecutive small number of symbols may be referred to as a UL sub-slot or mini-slot. The base station may indicate, through a higher layer configuration, to the terminal the UL control channel having one or more sub-slots according to a scenario. To support this, one, two or more HARQ-ACK bits may be included in the UL control channel (i.e., UCI channel), and a channel state information or a scheduling request may be included in the UL control channel. In some cases, the terminal may transmit the UL control channel to report a UL buffer state to the base station.

A method of transmitting a UCI channel having one symbol may be classified according to the presence or absence of a reference signal (RS). When the RS is not used, the UCI bits may be mapped in a predetermined manner to a given radio resource region. Since the RS does not exist, the base station may use a pattern of the UCI channel predetermined with the terminal without performing channel estimation in demodulating the UCI bit.

Here, since the radio resource region is discretely distributed, the pattern of the UCI channel predetermined with the terminal may be expressed in form of a sequence. In case that the UCI is a HARQ-ACK, the base station may determine an ACK when the base station detects a specific sequence, and may determine a NACK when the base station detects another specific sequence. Here, the UCI may be in form of ON/OFF shift keying (OOK) indicating whether or not a scheduling request exists, or may be in form of being transmitted together with HARQ-ACK bits.

In the case of using the RS, since the RS and the HARQ-ACK bits share the radio resource region having given symbols and subcarriers, a method of appropriately multiplexing the RS and the HARQ-ACK bits may be required. For orthogonal multiplexing, time division multiplexing (TDM), frequency division multiplexing (FDM), or the like may be considered. Also, for non-orthogonal multiplexing, space division multiplexing (SDM), code division multiplexing (CDM), power division multiplexing, or the like may be considered. In the case of the non-orthogonal multiplexing, it is difficult for the base station to estimate the UL channel by using the RS, so that the detection performance for the HARQ-ACK bit should be optimized and balanced (tradeoff). However, since there are many variables that cannot be included in the optimization such as terminals belonging to the adjacent cell, it is preferable to use a simple orthogonal multiplexing scheme rather than a non-orthogonal multiplexing scheme. Therefore, by using the orthogonal multiplexing scheme, the base station may estimate the UL channel through the RS, and estimate the HARQ-ACK from the resource not occupied by the RS. When the RS and the HARQ-ACK bits are used, an appropriate balance considering the amount of radio resources is required. Since the RS occupies radio resources, the resources for the HARQ-ACK bits are correspondingly small, so that the radio resources as much as the RS may be further allocated to the HARQ-ACK bits to improve the detection probability.

Mapping Method without Using RS

FIG. 3 is a diagram illustrating resource elements to which a UCI channel is allocated or a UCI channel and RSs are allocated. Referring to FIG. 3, a UCI channel transmission method (Method 1), which does not use the RS, will be described.

Radio resources for transmitting the UCI channel may be expressed by designating each resource element (RE) (e.g., 310) using a subcarrier index and a symbol index. The range of the subcarrier index may have a unit of a resource block. On the other hand, the range of the symbol index may have any natural number and the length of UL sub-slot. Here, the length of the UL sub-slot may be one of all values (e.g., 1, 2, 3, . . . , 14) ranging from 1 to 7 or 14, which is the length of the UL slot, and may be a value signaled by the base station through a Radio Resource Control (RRC) signaling, or a value specified by the base station through a DL control information (DCI) among values configured using the RRC signaling.

For example, a UCI channel to which 12 subcarriers and 2 symbols are allocated as radio resources may be represented by 24 REs as shown in FIG. 3. Here, a set of subcarrier indices of a first symbol and a set of subcarrier indices of a second symbol do not necessarily have to be the same, but the first symbol and the second symbol may correspond to adjacent symbols. If the first symbol and the second symbol have different sets of subcarrier indices, the UCI channel obtains a frequency diversity gain, and thus the base station may have a lower error rate. Although the first symbol and the second symbol are illustrated in FIG. 3, a symbol set may also be considered. The symbol set may be composed of one or more symbols, and one symbol set may have the same frequency resource (e.g., PRB index), but different symbol sets may have different frequency resources. In this case, since the UCI channel transmitted by the terminal obtains a frequency diversity gain, the base station may have a lower error rate.

As described above, since the RS is not used in transmitting the UCI channel, the HARQ-ACK bits may be mapped using all the REs allocated to the symbols. The method of mapping the HARQ-ACK bits may be identical to a method of generating a two-dimensional sequence.

Here, the method of mapping the HARQ-ACK bits may be classified into a first method of generating a two-dimensional sequence and a second method of generating a combination of one-dimensional sequences.

In the first method of generating a two-dimensional sequence, the terminal may generate a two-dimensional sequence according to the size of a radio resource that the base station and the terminal know in advance, and transmit the two-dimensional sequence to the base station. The base station may interpret a first two-dimensional sequence as an ACK, and interpret a second two-dimensional sequence as a NACK.

When the terminal generates two HARQ-ACK bits, the base station may interpret a first two-dimensional sequence as (ACK, ACK) in consideration of four cases. Also, the base station may interpret a second two-dimensional sequence as (ACK, NACK). Also, the base station may interpret a third two-dimensional sequence as (NACK, ACK). Also, the base station may interpret a fourth two-dimensional sequence as (NACK, NACK).

When the terminal generates n HARQ-ACK bits, $2^n$ two-dimensional sequences may be generated in consideration of $2^n$ cases. When the terminal transmits the corresponding UCI channel in order to transmit an SR to the base station, the base station may identify that the terminal makes the SR (positive SR). When the terminal does not transmit the corresponding UCI channel, the base station may not detect the corresponding UCI channel, and may recognize that the terminal does not make the SR (negative SR).

As described above, since a single terminal uses $2^n$ two-dimensional sequences, the base station may allocate two-dimensional sequences in direct proportion to the number of terminals that can be accommodated in the same radio resource (i.e., multiplexing order). In order to generate the two-dimensional sequences, at least the following methods may be applied.

For example, the terminal may generate a two-dimensional base sequence and generate each two-dimensional sequence by adjusting phases of complex numbers constituting the base sequence. A cyclic shift may be considered as an example of the adjustment of the phase. The base station may allocate one base sequence to the terminal, and the terminal may generate a two-dimensional sequence by applying a phase modulation corresponding to a combination of HARQ-ACK bits to the base sequence.

The base station may detect a two-dimensional sequence received from the terminal and phase-demodulate the detected sequence to determine which HARQ_ACK bit combination is received from which terminal. In order to sufficiently secure the detection performance of the HARQ-ACK bits, the two-dimensional sequence may be sufficiently large so that the base station may sufficiently obtain a spreading gain due to the two-dimensional sequence. Also, it may be possible to sufficiently randomly define a phase modulation pattern so that the base station can perform the phase demodulation without UL channel information.

The two-dimensional base sequence may be generated based on at least terminal identification information and cell identification information, and the phase demodulation pattern may be generated based on at least the terminal identification information.

As an example of the terminal identification information, a Radio Network Temporary Identifier (RNTI) or a Cell Radio Network Temporary Identifier (C-RNTI) may be considered. As an example of the cell identification information, a virtual cell identifier or a physical cell identifier may be considered. Alternatively, the phase modulation may be performed using a slot index or a sub-slot index other than or in addition to the cell identification information and the terminal identification information.

As another example, the base station may allocate $2^n$ two-dimensional sequences corresponding to the number of combinations of n HARQ-ACK bits to one terminal. Each of these two-dimensional sequences may mean one base sequence, or may refer to a sequence obtained by applying a different phase pattern to one base sequence. The terminal may select one of the two-dimensional sequences according to the combination of the HARQ-ACK bits and transmit the selected one to the base station. The base station may determine the combination of the HARQ-ACK bits through the detected two-dimensional sequence.

In the second method of generating a two-dimensional sequence, the terminal may generate a radio resource represented in a two-dimensional manner from a one-dimensional sequence. The terminal may generate a two-dimensional radio resource through a two-dimensional mapping of a combination of one-dimensional sequences or a one-dimensional sequence. This may be applicable when there are one or two HARQ-ACK bits.

Here, as a two-dimensional sequence, a sequence which can be factorized to a product of one-dimensional sequences may be used. In this case, a one-dimensional sequence having a length of K corresponding to a subcarrier length of the radio resource and a one-dimensional sequence having a length of L corresponding to a symbol length of the radio resource may be considered. This may be expressed as Equation 1 below.

$$S(k,l) = r_l(k) \times w(l),$$

$$k \in \{0, 1, \ldots, K-1\}, l \in \{0, 1, \ldots, L-1\} \quad \text{[Equation 1]}$$

In Equation 1, $r_l$ mapped to the frequency resources may be assigned a one-dimensional sequence differently by the phase demodulation or the like for each symbol. These one-dimensional sequences may be classified into orthogonal sequences and non-orthogonal sequences, depending on how they are generated.

Examples of orthogonal sequences may include DFT sequences generated by rows or columns of Discrete Fourier Transform (DFT) matrices, selection sequences generated by rows or columns of identity matrices, and Hadamard sequences generated by rows or columns of Hadamard matrices.

Examples of the non-orthogonal sequences may include Pseudo Noise sequences, Zadoff-Chu sequences, and Gold sequences. As a method for randomizing interferences between UCI channels by using a non-orthogonal sequence, the phase pattern applied in the first method for generating the two-dimensional sequence described above may be used. In order to generate such the phase pattern, the terminal identification information or the base station identification information may be used.

In the second method of generating a two-dimensional sequence described above, the two-dimensional sequence may be generated differently for purposes such as interference management or interference cancellation.

As an example, in the case of a radio channel having a large frequency selectivity and a small time selectivity, a non-orthogonal sequence may be used as a one-dimensional sequence in the frequency dimension, and an orthogonal sequence may be used as a one-dimensional sequence in the time dimension. In this way, it is possible to randomize the interferences between UCI channels in the frequency resource and to eliminate the interferences between UCI channels in the time resource.

As another example, in the case of a radio channel having both the frequency selectivity and the time selectivity, the interferences between UCI channels of terminals may be randomized by using non-orthogonal sequences for all one-dimensional sequences.

FIG. 4 is a diagram illustrating an example of mapping 2 symbols and 12 subcarriers. FIG. 5 is a diagram illustrating another example of mapping 2 symbols and 12 subcarriers.

Referring to FIGS. 4 and 5, as an example, a one-dimensional sequence may be generated and the mapping of the REs may be performed in the two-dimensional manner. The length of the one-dimensional sequence may correspond to a product of the number of symbols and the number of subcarriers. As another example, a one-dimensional sequence may take into account an orthogonal sequence and a non-orthogonal sequence. Examples of the orthogonal and non-orthogonal sequence may utilize all of the sequences described above. When the non-orthogonal sequence is used, the phase pattern may be used to randomize the interferences between UCI channels and all of the methods described above may be applied.

As a method of generating a one-dimensional sequence in the two-dimensional manner, as shown in FIG. 4, the terminal may map the REs in order of time resources, and then map the REs in order of frequency resources (i.e., time first mapping). As another example, as shown in FIG. 5, the terminal may map the REs in order of frequency resources, and then map the REs in order of time resources (i.e., frequency first mapping).

The subcarriers or symbols may correspond to the one-dimensional sequence in the ascending or descending order from a low index. The radio resource illustrated in FIGS. 4 and 5 have 12 subcarriers and 2 symbols. Here, the set of subcarrier indices of the first symbol and the set of subcarrier indices of the second symbol do not necessarily have to be the same, but the first symbol and the second symbol may be adjacent symbols. When the sets of subcarrier indices of the first symbol and the second symbol are different from each other, the UCI channel may have a lower error rate through frequency multiplexing. The numbers of the REs in FIGS. 4 and 5 may correspond to the index of the one-dimensional sequence.

In the case of the UCI channel composed of sets of symbols, mapping of the REs may be performed within one symbol set, and mapping of the remaining REs may be then performed within another symbol set. The mapping method described above may be applied within one symbol set.

Reference Signal Mapping Method

Figure 6:
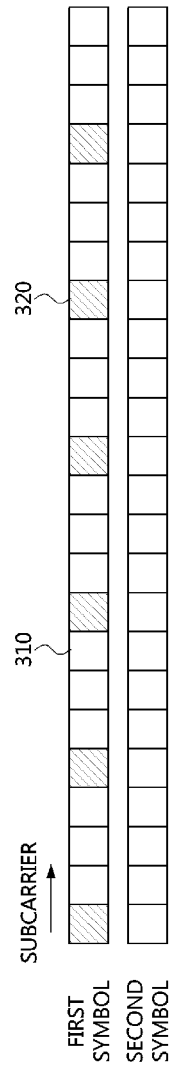
FIG. 6 is a diagram illustrating a method of allocating RS REs to specific symbols and specific subcarriers.
Figure 7:
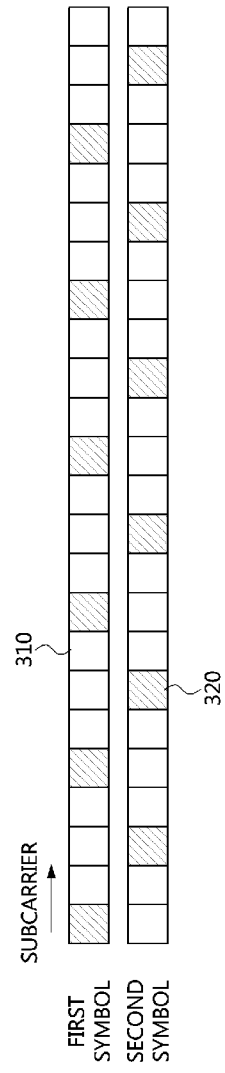
FIG. 7 is a diagram illustrating a method of uniformly allocating RS REs to symbols and subcarriers.
Figure 8:
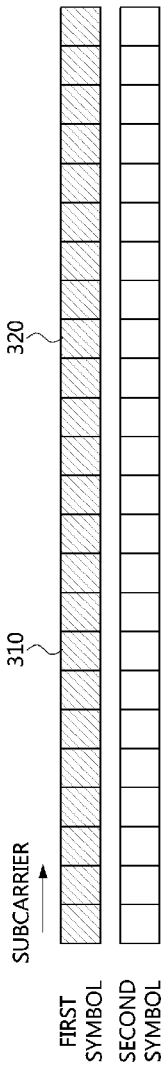
FIG. 8 is a diagram illustrating a method of allocating RS REs to all subcarriers of a specific symbol.

FIG. 6 is a diagram illustrating a method of allocating RS REs to specific symbols and specific subcarriers. FIG. 7 is a diagram illustrating a method of uniformly allocating RS REs to symbols and subcarriers. FIG. 8 is a diagram illustrating a method of allocating RS REs to all subcarriers of a specific symbol. Hereinafter, a UCI channel transmission method (Method 2) using the RS will be described with reference to FIGS. 6 to 8.

The terminal may arrange REs of data 310 and REs of the RS 320 in one symbol. The base station may receive the REs of the RS, estimate the UL channel using the RS, and detect the HARQ-ACK bit using the estimated channel. The amount and location of radio resources occupied by the RS 320 may be determined as shown in FIGS. 6 to 8. In FIGS. 6 to 8, the size of the sub-slot is 2, but the size of the sub-slot is not limited thereto.

In FIG. 7, the set of subcarrier indices of the first symbol and the set of subcarrier indices of the second symbol do not necessarily have to be the same. Also, in FIGS. 6 and 8, the set of subcarrier indexes of the first symbol and the set of subcarrier indexes of the second symbol may be the same.

In FIG. 7, when radio resources are considered so that the first symbol and the second symbol have different subcarrier index sets, the detection performance of the UCI channel may be further enhanced by using the frequency selectivity characteristics of the radio channel. In FIG. 7, the subcarrier index interval of the first symbol occupied by the UCI channel is equal to the subcarrier index interval of the second symbol, and the start indexes of the subcarriers are different. However, without being limited thereto, it may be also possible to consider a case where the start indexes of subcarriers are equal to each other in accordance with the higher layer configuration.

Here, as an example of allocating the UCI channel and the RS 320 in a radio resource composed of 24 subcarriers and 2 symbols, an example of mapping the RS 320 to only a part of subcarriers of a part of symbols is illustrated in FIG. 6. When considering the radio channel having high frequency selectivity characteristics, if the UL channel estimation performance is low, the RS 320 may be mapped to all subcarriers belonging to a part of symbols as shown in FIG. 8.

When considering the radio channel having high time selectivity characteristics due to a high mobility of the terminal, since the UL channel estimation is inaccurate, as shown in FIG. 7, the REs including the RS 320 may be mapped so as not to be limited to specific symbols or specific subcarriers in the radio resource. That is, the RS 320 may be evenly mapped to subcarriers of a plurality of symbols. By arranging the REs at the same time and frequency intervals, it may be possible to minimize dispersion of errors in channel estimation.

As a method of mapping the RS 320 to radio resources, the REs occupied by the RS 320 may be separately collected and placed in one symbol or two symbols.

In the case that the RS is not used, when the HARQ-ACK bits are 1 or 2 bits, only the REs to which the HARQ-ACK bits are allocated may be separately collected and mapped. However, since the RS can be used, the HARQ-ACK may be modulated with the phase information of the sequence and transmitted. For example, when the HARQ-ACK bits are modulated to PSK symbols, this may be interpreted as modulation of phase information.

As an example, the HARQ-ACK bits (b0 or b0, b1) may be transmitted using a two-dimensional sequence A. As another example, each of the HARQ-ACK bits (b0 or b0, b1) may be obtained by modulating each of the HARQ-ACK bits to a BPSK symbol c or a QPSK symbol d and multiplying it to the two-dimensional sequence. The obtained c·A or d·A may be mapped to radio resources.

When a two-dimensional sequence is derived from one-dimensional sequences, a product of the two-dimensional sequence and the BPSK symbol c or the QPSK symbol d to which the HARQ-ACK bits are modulated may be represented. This may be represented as shown in Equation 2 below.

$$S(k',l')=c \cdot r_{l'}(k') \times w(l') \text{ or } d \cdot r_{l'}(k') \times w(l'),$$

$$k' \in \{0,1,\ldots,K'-1\}, l' \in \{0,1,\ldots,L'-1\} \quad \text{[Equation 2]}$$

In Equation 2, $r_{l'}$ mapped to the frequency resource may be differently assigned to a one-dimensional sequence by phase demodulation or the like for each symbol. Here, K' may correspond to the number of subcarriers available for HARQ-ACK bits, and L' may correspond to the number of symbols available for HARQ-ACK bits. S(k', l') may be mapped to a suitable RE of the radio resource according to a predetermined rule defined in the standard specification. In this case, the one-dimensional sequence may be applied in the same manner as described above.

The method of mapping the one-dimensional sequence s to the REs in the two-dimensional manner in order to generate the two-dimensional sequence S may be represented differently from the above Equation 2.

When the RE mapping starts from a subcarrier, Equation 3 below may be applied.

$$S(k',l')=c \cdot s(K'l'+k') \text{ or } d \cdot s(K'l'+k'),$$

$$k' \in \{0,1,\ldots,K'-1\}, l' \in \{0,1,\ldots,L'-1\} \quad \text{[Equation 3]}$$

When the RE mapping starts from a symbol, Equation 4 below may be applied.

$$S(k',l')=c \cdot s(l'+L'k') \text{ or } d \cdot s(l'+L'k'),$$

$$k' \in \{0,1,\ldots,K'-1\}, l' \in \{0,1,\ldots,L'-1\} \quad \text{[Equation 4]}$$

In the UCI channel transmission methods described above, harmony with other physical channels should be considered. For example, coexistence of UCI channels, coexistence of UCI channel and uplink data channel, and coexistence of UCI channel and sounding channel should be considered. Here, the coexistent channels may be transmitted by different terminals or may be transmitted by one terminal.

Transmission Scheme Selection According to Payload

The terminal may generate the UCI channel differently depending on the number of bits (payload) carried by the UCI and the type of the UCI. The terminal may consider the case of transmitting 1 bit or 2 bits. In this case, the UCI type may include HARQ-ACK, channel state information (CSI), and scheduling request (SR). As a concrete example, a case of transmitting a positive SR, a case of transmitting a HARQ-ACK for one or two CBgs transmitted by the base station, a case of transmitting a CRI or a RI in a periodic CSI feedback procedure when the CRI or RI is configured to be equal to or less than 2 bits, a case of transmitting a HARQ-ACK for a message 4 (M4) during initial access, or a case to which the above-described cases are combined may correspond to the case. Since different types of UCI have different target error rates, different coding rates may be applied to them or different transmission power may be applied to them even if they have the same UCI channel structure.

When the UCI channel is configured with a single symbol, the UCI channel may include the RS, and the UCI may be included in the REs remaining after placing the RS. When the UCI channel is configured with a single symbol, the RS and the UCI may be mapped to the REs using frequency multiplexing (FDM).

When 3 bits or more are transmitted, the UCI channel may include the RS, and the UCI may be included in the REs remaining after placing the RS. When the UCI channel is configured with a single symbol, the RS and the UCI may be mapped to the REs using FDM.

Scheduling Requests, using Multiple Bits

Figure 9:
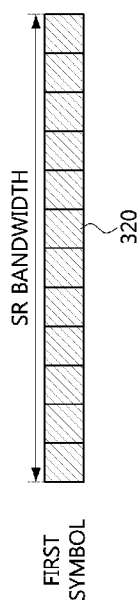
FIG. 9 is a diagram illustrating a UCI channel configured with RS REs.
Figure 10:
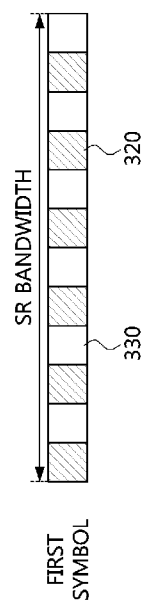
FIG. 10 is a diagram illustrating a UCI channel in which a zero power (ZP) RS is additionally configured.

FIG. 9 is a diagram illustrating a UCI channel configured with RS REs. FIG. 10 is a diagram illustrating a UCI channel in which a zero power (ZP) RS is additionally configured.

Referring to FIGS. 9 and 10, a case may be considered in which a base station configures a terminal to perform an uplink transmission based on a grant. The terminal may transmit an SR to the base station, receive a scheduling grant from the base station, and transmit uplink data. In case of data related to an Ultra-reliable Low-Latency Communication (URLLC) service, the base station may configure the terminal to transmit an SR using a single symbol UCI channel. In this case, the UCI channel for the SR may be represented by 1 bit or 2 bits or more.

For example, when the base station configures an SR resource to the terminal irrespective of a service scenario (e.g., enhanced Mobile Broadband (eMBB), URLLC, or massive Machine Type Communications (mMTC)), the terminal should inform the base station whether the reason for the SR is for the uplink eMBB transmission or the uplink ULLC transmission. In the case of the SR for uplink URLLC transmission, the base station should be able to quickly recognize the SR and transmit a scheduling grant to the corresponding terminal. For this, the base station may configure a separate SR resource (i.e., service-specific resource) for each service, and the terminal may transmit the UCI channel by selecting an SR resource among the SR resources. The base station may identify the desired service based on the selection of the terminal. For this purpose, the base station may configure different periods, different Transmission Time Intervals (TTIs), or different parameters (numerology or subcarrier spacing) for the respective services.

Alternatively, the base station may configure an SR resource regardless of a service, and the terminal may inform the desired service to the base station by expressing the SR in several bits. For example, the terminal may express an SR for uplink eMBB transmission, an SR for uplink URLLC transmission, and an SR for uplink mMTC transmission by using 1 bit or 2 bits or more.

Alternatively, the base station may configure an SR resource for the URLLC service to the terminal, and the terminal may generate an SR by expressing the amount of the UL buffer in several bits. For example, the terminal may classify the amount of URLLC traffic according to its size into four steps, and map the information on the amount to 2-bit information to generate an SR.

On the other hand, a UCI channel that transmits only an SR and does not transmit another UCI may be considered. Since the UCI channel including only the SR does not need to include the UCI separately, the terminal may use only the SR resource configured from the serving base station as shown in FIG. 9. In this case, the number of symbols included in the UCI channel may be one or more (e.g., 1, 2, etc.), and only the first symbol belonging to the UCI channel is shown in FIG. 9.

The base station may configure to allow transmission of a sounding reference signal (SRS) in the same subband as that of the UCI channel transmitting the SR. When a first terminal transmits the UCI channel and a second terminal transmits the SRS, it may be difficult for the base station to effectively eliminate the interference between the UCI channel and the SRS. Also, since interference signals of different intensities are received at respective REs, the REs of the UCI channel colliding with the SRS may have different reception qualities from the REs of the UCI channel not colliding with the SRS. In order to prevent this, a transmission comb (TC) may be introduced to the UCI channel as shown in FIG. 10. The number of symbols of the UCI channel is one or two, and only the first symbol belonging to the UCI channel is shown in FIG. 10. Since the UCI channel transmits only the SR, subcarriers excluding the RS may not be transmitted.

UCI Channel (Single Symbol) Carrying 1 Bit or 2 Bits

The structure of a UCI channel using a single symbol is closely related to the SRS. The SRS may be configured to TC 2 or 4, and the UCI channel may be affected by the TC value. When the SRS is expressed as a complex vector having a constant length of a Zadoff-Chu (ZC) sequence and is mapped to REs of subcarriers, a case in which 1 bit or 2 bits are transmitted in the UCI channel may be considered.

In the case of transmitting 1-bit UCI, the terminal may perform frequency multiplexing (FDM) on subcarriers corresponding to the DM-RS of the UCI channel and subcarriers corresponding to the spreaded UCI corresponding to two cases. In order to efficiently coexist with the SRS and utilize a Constant Amplitude Zero Auto Correlation (CAZAC) property, the terminal may generate an SRS "z" as a DM-RS sequence. An SRS "w" may also be applied to the spreading code applied to the UCI. The RE mapping in this case may be expressed as the following equations.

For example, in the case of DM-RS, it may be expressed as (z(0) 0 0 0 z(1) 0 . . . ). Also, if the UCI is assigned to adjacent subcarriers, it may be expressed as (0 w(0) 0 0 0 w(1) . . . ). The equation for the UCI channel is the sum of these and may be expressed as (z(0) w(0) 0 0 z(1) w(1) . . . ).

Here, the number of zeros may be determined by the TC of the SRS. In order to transmit 1 bit, orthogonal cover codes (OCCs) between subcarriers may be applied. For example, an OCC of length 2 is a Walsh sequence, which may be [1, 1] or [1, −1]. When the OCC has an arbitrary length, a subsequence of the Walsh sequence may be used. As another example, a DFT sequence may be used. This allows the elements of the sequence to use the Van der Monde structure of the nth root of unity.

Using this method, the UCI channel for transmitting 1 bit may be generated by applying OCCs of length 2 to the base sequence (z(0) w(0) 0 0 z(1) w(1) . . . ). For example, the terminal may generate (z(0) w(0) 0 0 z(1) w(1) . . . ) to transmit '0', and generate (z(0)−w(0) 0 0 z(1)−w(1) . . . ) to transmit '1'. Since the value of "z" in the subcarrier in which the value is located is known in advance, the base station may use it as the DM-RS.

By extending the same method, the UCI channel for transmitting 2 bits may be generated by repeatedly applying OCCs of length 4 to the base sequence (z(0) w(0) 0 0 z(1) w(1) . . . ). At this time, a Walsh sequence or a DFT sequence may be applied. As an example, when a Walsh sequence is applied, the terminal may generate (z(0) w(0) 0 0 z(1) w(1) . . . ) to transmit '0', and generate (z(0) w(0) 0 0−z(1)−w(1) . . . ) to transmit '1'. Also, the terminal may generate (z(0)−w(0) 0 0−z(1) w(1) . . . ) to transmit '2', and generate (z(0)−w(0) 0 0 z(1)−w(1) . . . ) to transmit '3'.

As another method, when a DFT sequence is applied, the terminal may generate (z(0) w(0) 0 0 z(1) w(1) . . . ) to transmit '0', and generate (z(0)−j·w(0) 0 0−z(1) j·w(1) . . . ) to transmit '1'. Also, the terminal may generate (z(0)−w(0) 0 0 z(1)−w(1) . . . ) to transmit '2', and generate (z(0) j·w(0) 0 0−z(1)−j·w(1) . . . ) to transmit '3'. The base station may use this as the DM-RS since its value is known in advance (e.g., z(0), . . . , z(2)) in a subcarrier with a code of 1 applied to "z".

On the other hand, the mapping of the REs may be expressed as (z(0) 0 w(0) 0 z(1) 0 w(0) . . . ) using another Equation. In this case, since the UCI is located at a farther subcarrier than the DM-RS, the channel estimation and channel interpolation methods may have a larger error than the RE mapping described above. However, when the UCI and the DM-RS are located at subcarriers at the same interval, there is an advantage of lowering a Peak to Average Power Ratio (PAPR).

The above-described method use two sequences, but when the UCI and DM-RS are generated from the same sequence, there is no need to distinguish between the UCI and the DM-RS. Since the subcarriers are located at the same interval, the PAPR performance of the sequence may be maintained as it is equivalent to the operation of mapping one sequence to the REs.

Coexistence of UCI Channel, Data Channel, and SRS

Figure 11:
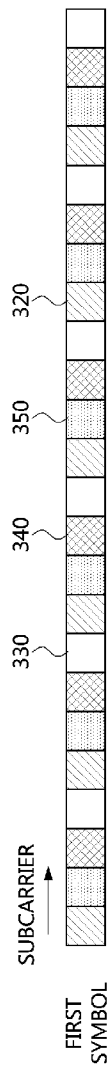
FIG. 11 is a diagram illustrating a method of allocating REs when a UCI channel and data coexist in a symbol.

FIG. 11 is a diagram illustrating a method of allocating REs when a UCI channel and data coexist in a symbol.

Referring to FIG. 11, coexistence of the UCI channel and the data channel may be considered. In this case, the REs excluding the RS 320 among the radio resources that can be used by the UCI channel may be used for transmitting HARQ-ACK bits 350 or other UCI. In FIG. 11, REs 330 not used may be included in a symbol. In the case that the base station configures, not only HARQ-ACK bits 350 but also uplink data 340 of the terminal transmitting the corresponding HARQ-ACK bits 350 or UL data of another terminal may be allocated.

For example, in the same sub-slot, a first terminal may transmit a UCI channel, and a second terminal may transmit a data channel. It may be preferable that the base station configures the REs used by the first terminal to be different from the REs used by the second terminal. Herein, the data channel transmitted by the second terminal may be transmitted in a UL slot or an UL-centric slot, or it may be assumed that the UL resource scheduling is distinctively performed by the base station to a second terminal to adjust the range of the time resource of the data channel so that the time resource includes at least the symbol in which the UCI channel exists.

In this case, the mapping of the REs of the UL data 340 of the terminal may use all or a part of REs excluding all REs to which the RS 320 and the HARQ-ACK bits 350 are mapped.

The radio resource illustrated in FIG. 11 is composed of a sub-slot corresponding to 1 symbol and 12 subcarriers, and a UCI channel configured with the RS 320 and the HARQ-ACK bits 350, and UL data channel 340 may coexist therein. The base station may allocate the UCI channel and the UL data channel 340 to one terminal but does not need to occupy all the REs, and as shown in FIG. 11, the base station may not allocate power to some REs 330. In FIG. 11, a case that the first terminal and the second terminal are identical is illustrated.

Figure 12:
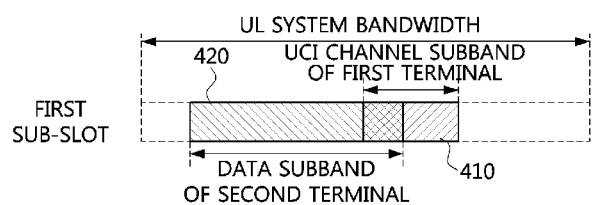
FIG. 12 is a diagram illustrating that a part of the UCI channel of the first terminal and a part of the data of the second terminal are overlapped when the UCI channel of the first terminal and the data of the second terminal coexist in a sub-slot.

FIG. 12 is a diagram illustrating that a part of the UCI channel of the first terminal and a part of the data of the second terminal are overlapped when the UCI channel of the first terminal and the data of the second terminal coexist in a sub-slot.

Referring to FIG. 12, in a UL system band of a first sub-slot, a subband of the UCI channel 410 of the first terminal and a subband of the data channel 420 of the second terminal may be overlapped. The UCI channel may coexist in a frequency band with the UL data channel when transmitting the UCI channel in a sub-slot constituted by one or more symbols.

The UCI channel 410 transmitted by the first terminal to the base station may be transmitted in a subband, and the data channel 420 transmitted by the second terminal to the base station may be transmitted in a subband. In this case, the scheduling of the base station may partially overlap the subband of the data channel 420 and the subband of the UCI channel 410. Here, as shown in FIG. 11, when the second terminal encodes the data channel 420, the second terminal may not allocate powers (i.e., zero power) to the REs where the UL channels of other terminals are expected to exist, and a coding rate may be determined by considering only the REs that can be utilized, and data may be encoded and mapped to the REs. The reception performance of the base station may be enhanced by using such the rate matching.

The base station may configure the frequency band of the data channel transmitted by the terminal to be changed according to a predetermined pattern every predetermined time unit. When such the frequency hopping is defined, it is preferable that both the data channel and the UCI channel perform the frequency hopping.

Meanwhile, as shown in FIG. 12, the data channel 420 may not perform hopping within a sub-slot, and the UCI channel 410 may also not perform hopping.

Here, a case that the data channel 420 performs hopping but the UCI channel 410 does not perform hopping may be assumed. In this case, in the process that the base station receives the data channel 420 and estimates the channel using the DM-RS, channel estimation based on the DM-RS and channel estimation based on the data REs may be different. For example, when the DM-RS collides with the UCI channel but the data REs do not collide with the UCI channel 410, since the interferences hypothesis of the base station varies, an error rate may increase during the decoding process.

In the opposite case, a case that the UCI channel 410 does not perform hopping but the data channel 420 performs hopping may be assumed. In this case, it may be preferable to configure the frequency hopping for the terminal transmitting the UCI channel 410, and a time granularity of such the frequency hopping may be set to be equal in the UCI channel 410 and the data channel 420.

Meanwhile, the UL data channel may not carry data in the REs through which the UCI channel or the SRS is transmitted. The first terminal transmitting the UL data channel and the second terminal transmitting the UCI channel or the SRS may perform transmissions in the same symbol. In this case, the first terminal may transmit data on the UL data channel by using only the REs through which the second terminal does not perform transmissions. For this, the first terminal may adjust a coding rate (i.e., rate-matching). As another example, in the case of the first terminal that does not have the capability to adjust the coding rate, the first terminal may not allocate data to the corresponding symbol (shortened format). On the other hand, when it is necessary for a third terminal to transmit the UCI channel and the UCI channel or the SRS in the same symbol, the third terminal may transmit all of them according to configuration of the base station, or may transmit a part of them according to priorities defined by the standard specification.

Method for PUSCH to Avoid Resources Allocated for SRS Occasion

Figure 13:
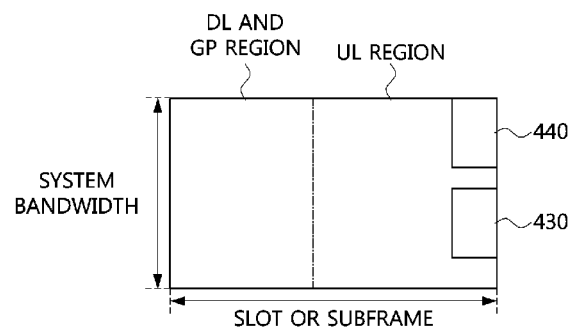
FIG. 13 is a diagram illustrating a slot in which a UCI channel and an SRS coexist.

FIG. 13 is a diagram illustrating a slot in which a UCI channel and an SRS coexist.

Referring to FIG. 13, a UCI channel 430 and an SRS 440 may coexist in a UL region. A first terminal may transmit the UCI channel 430 and a second terminal may transmit the SRS 440. FIG. 13 shows an example in which the UCI channel 430 and the SRS 440 are located in the last symbol of the slot irrespective of the boundary between the downlink region and the guard period (GP) region. However, without being limited thereto, a case that the UCI channel 430 and the SRS 440 are generated in the same uplink symbol may also be considered. In this case, the UCI channel 430 and the SRS 440 may be transmitted on the same subcarriers according to the higher layer configuration of the base station and the DCI.

The SRS 440 may be transmitted from the terminal to the base station according to the configuration from the higher layer of the base station or the configuration of the higher layer and the DCI. The SRS 440 may occupy some regular subcarriers among radio resources confined to some consecutive resource blocks (RBs) and one symbol. The SRS 440 may correspond to a one-dimensional sequence, and parameters involved in generation of the one-dimensional sequence may follow the higher layer configuration of the base station. The terminal may periodically transmit the SRS 440 according to configuration of the base station, or transmit the SRS 440 non-periodically according to a DCI.

Figure 14:
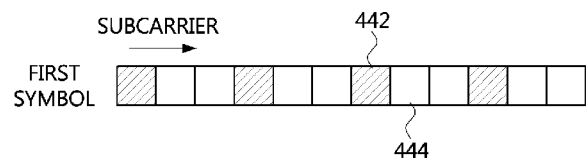
FIG. 14 is a diagram illustrating an example of arranging an SRS (comb3)

FIG. 14 is a diagram illustrating an example of arranging an SRS (comb 3).

Referring to FIG. 14, REs 442 of an SRS and unused REs 444 may be disposed in the first symbol. The SRS may be allocated to one subcarrier among three subcarriers, which corresponds to a case where the transmission comb is 3. As a result, four REs may correspond to one RE of the SRS.

In order to transmit multiple SRSs on the same radio resource, the base station may configure different sets of subcarrier indexes or generate different one-dimensional sequences to suppress the interference between the SRSs. For example, in case of the SRS of the LTE-advanced pro system, a bandwidth may be configured in a multiple of 4 in resource block (RB) units, and a value of TC may be configured to 2 or 4. Also, interferences between one-dimensional sequences may be suppressed by using ZC sequence and cyclic shift.

In order for the base station to configure the UCI channel and the SRS on the same radio resource, a method of suppressing interferences between the UCI channel and the SRS should be considered. Since the SRS described above maps a one-dimensional sequence to REs according to a predetermined rule, if a UCI channel occupying only one symbol is considered, a RS and a UCI constituting the UCI channel may be generated in a one-dimensional sequence.

When a one-dimensional sequence generating the SRS and a one-dimensional sequence generating the UCI channel are set to be the same, a gain may be obtained in terms of interference suppression as compared with the otherwise case. Therefore, both the RS and the UCI of the UCI channel may be generated from the one-dimensional sequence of the SRS, and the base station may configure appropriate generation parameters for the terminal.

Specifically, when a given radio resource is composed of 1 symbol and N RBs, if a TC is set to k, the SRS, the RS of the UCI channel, and the UCI of the UCI channel may all have a length of 12×N/k. Unlike the RS of the UCI channel, the UCI of the UCI channel may be obtained by multiplying at least one modulated PSK symbol including HARQ-ACK bits to the one-dimensional sequence.

Figure 15:
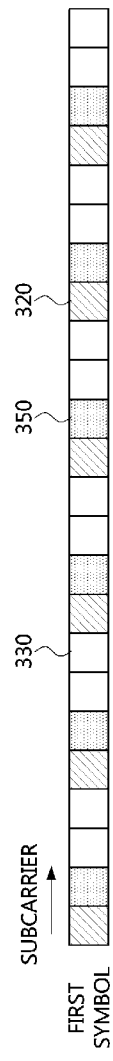
FIG. 15 is a diagram illustrating an example of assigning a UCI channel to a RB.
Figure 16:
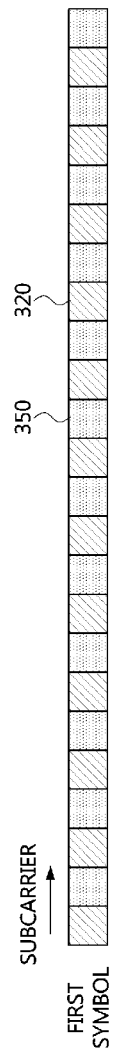
FIG. 16 is a diagram illustrating another example of assigning a UCI channel to a RB.

FIG. 15 is a diagram illustrating an example of assigning a UCI channel to a RB. FIG. 16 is a diagram illustrating another example of assigning a UCI channel to a RB. FIG. 15 and FIG. 16 illustrate types of the radio resource occupied by the UCI channel when 1 RB is configured by the base station. As shown in FIG. 15, the terminal may configure a symbol to include the RSs 320, the unused REs 330 (i.e., zero power REs), and the HARQ-ACK bits 350, and transmit the symbol to the base station. Also, as shown in FIG. 16, the terminal may configure a symbol to include the RSs 320 and the HARQ-ACK bits 350, and transmit the symbol to the base station.

The same RE mapping is illustrated as the case where one terminal transmits two sounding resources. The base station may set the bandwidth of the UCI channel according to RB units that the sounding resource can have. FIG. 15 illustrates the case where TC is 4, and FIG. 16 illustrates the case where TC is 2. The TC value may be set to the same value as the TC of the SRS 320 set by the base station.

The base station may match the UCI of the UCI channel to a longer one dimensional sequence as needed. In FIG. 14, although one sounding resource is allocated to the UCI, a plurality of sounding resources may be allocated to the UCI as needed.

Figure 17:
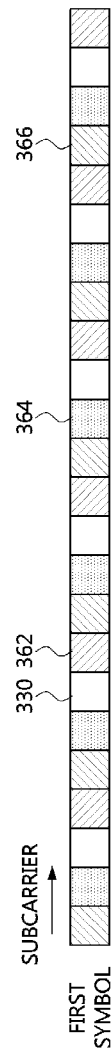
FIG. 17 is a diagram illustrating an example of a UCI channel in which two SRS resources are allocated to a UCI.

FIG. 17 is a diagram illustrating an example of a UCI channel in which two SRS resources are allocated to a UCI.

Referring to FIG. 17, an example (i.e., comb 4) of a UCI channel that is confined to 2 RBs and allocates 2 SRS resources to a UCI is illustrated. The terminal may configure a first sounding resource 362 having a TC of 4 as the RS of the UCI channel, and configure a second sounding resource 364 and a third sounding resource 366 as the UCI of the UCI channel. In the case of generating 1 or 2 bits of HARQ-ACK, the terminal may generate a one-dimensional sequence having a length of two times to use two sounding resources. If more UCI bits are generated, the terminal may use two sounding resources to map the encoded UCI bits.

As a method for mapping REs, a method of mapping REs in order of subcarrier indexes, or a method of mapping REs in order of subcarrier indexes per sounding resource may be applied.

Figure 18:
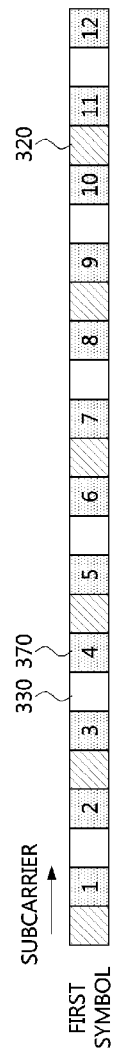
FIG. 18 is a diagram illustrating a method of mapping a first SRS resource and a second SRS resource to one UCI resource.

FIG. 18 is a diagram illustrating a method of mapping a first SRS resource and a second SRS resource to one UCI resource.

Referring to FIG. 18, an example (i.e., linear mapping) of mapping REs in case of comb 4 in 2 RBs is illustrated. In the method of mapping REs in order of subcarrier indexes, the terminal may map the first sounding resource and the second sounding resource to a first UCI resource 370 without distinguishing the first sounding resource and the second sounding resource from each other. At this time, the terminal may map a one-dimensional sequence having a length of 12 to the subcarriers in numerical order, and transmit it to the base station. The base station may estimate the UL channel from the REs of the RS 320 and detect the HARQ-ACK bits from the first UCI resource 370.

Figure 19:
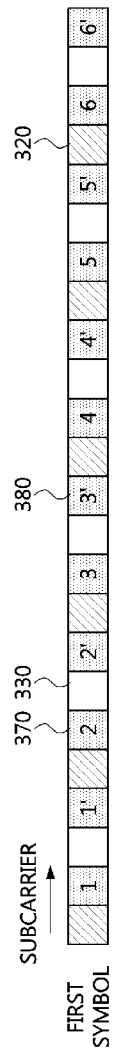
FIG. 19 is a diagram illustrating a method of mapping a first SRS resource to a first UCI resource and a second SRS resource to a second UCI resource.

FIG. 19 is a diagram illustrating a method of mapping a first SRS resource to a first UCI resource and a second SRS resource to a second UCI resource.

Referring to FIG. 19, an example (i.e., interlacing) of mapping REs in case of 4 comb in 2 RBs is illustrated. In the method of mapping REs in order of subcarrier indexes, the terminal may map the first sounding resource to the first UCI resource 370 and the second sounding resource to the second UCI resource 380. The first UCI resource 370 may correspond to the subcarriers in order of 1, 2, 3, 4, 5, and 6, by mapping a one-dimensional sequence having a length of 6 to the subcarriers in numerical order. The second UCI resource 380 may then correspond to subcarriers in order of 1', 2', 3', 4', 5', and 6'.

As another example, the base station may first allocate the second UCI resource 380, and then allocate the first UCI resource 370. The terminal may first map the second UCI resource 380 and then map the first UCI resource 370. Here, a first CAZAC sequence may be applied to the first UCI resource 370. Then, a second CAZAC sequence may be applied to the second UCI resource 380. In this case, they may be generated from the same base sequence, but may be generated by applying different phase modulations to the same base sequence. This may be applied to the case of generating 1 or 2 bits of HARQ-ACK as the UCI.

The base station may further allocate a third sounding resource or a further sounding resource to the terminal, and allocate the UCI channel in order. In this case, the terminal may map the UCI channel to the subcarriers using the above-described method. Since the terminal transmits HARQ-ACK bits using a larger number of subcarriers, an energy per RE in one subcarrier may be reduced. On the other hand, since the base station obtains a spreading gain or a coding gain, the number of REs allocated to the UCI channel by the base station may be adjusted according to a frequency selectivity and a propagation path loss of the radio channel.

Figure 20:
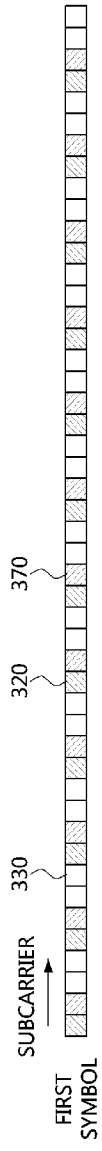
FIG. 20 is a diagram illustrating a first embodiment of a UCI channel composed of 48 subcarriers.
Figure 21:
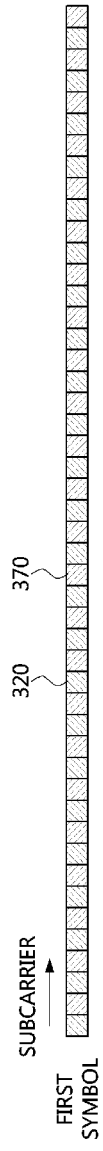
FIG. 21 is a diagram illustrating a second embodiment of a UCI channel composed of 48 subcarriers.
Figure 22:
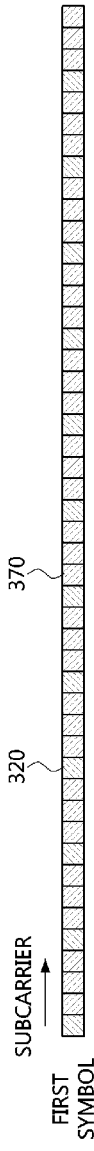
FIG. 22 is a diagram illustrating a third embodiment of a UCI channel composed of 48 subcarriers.
Figure 23:
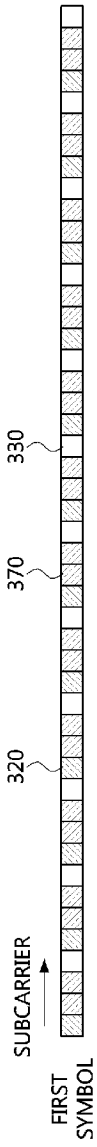
FIG. 23 is a diagram illustrating a fourth embodiment of a UCI channel composed of 48 subcarriers.

FIG. 20 is a diagram illustrating a first embodiment of a UCI channel composed of 48 subcarriers. FIG. 21 is a diagram illustrating a second embodiment of a UCI channel composed of 48 subcarriers. FIG. 22 is a diagram illustrating a third embodiment of a UCI channel composed of 48 subcarriers. FIG. 23 is a diagram illustrating a fourth embodiment of a UCI channel composed of 48 subcarriers.

Referring to FIGS. 20 to 23, the base station may set a ratio of the RS and a ratio of the UCI resource to the terminal using a higher layer signaling. The base station may set the ratio of the RS and the ratio of the UCI resource to the terminal according to the number of bits (1 or 2 bits or more) of the UCI channel. Also, the base station may set the ratio of the RS and the ratio of the UCI resource to the terminal according to the path loss of the UL between the terminal and the base station.

The base station knows the number of bits of the UCI channel of the terminal in advance, and assumes channel reciprocity so that the UL path loss is estimated using an estimated value of the DL path loss reported from the terminal. Also, the base station may directly estimate the UL path loss through the SRS. The RE mapping of the UCI channel for this may be determined by the TC and the bandwidth of the UCI channel. As shown in FIGS. 20 to 23, the UCI channel may be set to have 48 subcarriers.

As one example, referring to FIG. 20, when the ratio of the RS 320 to the UCI resource 370 is 1:1 and the UCI channel is confined to 4 RBs, the TC is set to 4, the length of the RS 320 is set to 12, and the length of the UCI resource 370 is set to 12.

As another example, referring to FIG. 21, when the ratio of the RS 320 to the UCI resource 370 is 1:1 and the UCI channel is confined to 4 RBs, the TC is set to 2, the lengths of the RS 320 and the UCI resource 370 are set to 24.

As another example, referring to FIG. 22, when the ratio of the RS 320 to the UCI resource 370 is 1:3 and the UCI channel is confined to 4 RBs, the TC is set to 4, the length of the RS 320 is set to 12, and the length of the UCI resource 370 is set to 36.

As another example, referring to FIG. 23, when the ratio of the RS 320 to the UCI resource 370 is 1:2 and the UCI channel is confined to 4 RBs, the TC is set to 2, the length of the RS 320 is set to 12, the length of the UCI resource 370 is set to 24, and the length of unused REs 330 (i.e., zero power REs) is set to 12.

In FIGS. 20 and 23, in consideration of coexistence with a sounding resource or a UL data channel, the base station may not use a part of subcarriers belonging to the bandwidth of the UCI channel, and map the UCI using the remaining subcarriers. Also, in FIGS. 20 to 23, for the RE mapping allocating the sequence to subcarriers, the RE mapping method described with reference to FIG. 18 or the RE mapping method described with reference to FIG. 19 may be applied.

Here, the UCI resource may be utilized differently depending on the number of bits of the UCI channel. In the case of the UCI resource for transmitting 1 or 2 bits, the terminal may transmit the UCI using one CAZAC sequence. On the other hand, in the case of the UCI resource for transmitting several tens of bits, the terminal may map the UCI encoded through channel coding (i.e., forward error correction coding) to the REs of the UCI channel. In this case, the coding rate may be adjusted considering the coexistence with the sounding resource or the UL data channel, and some of the REs belonging to the symbol and the bandwidth of the UCI channel may not be used.

The base station may set the relative ratio of the transmission powers of the RS and the UCI in the UCI channel by a higher layer signaling. When necessary, the base station may instruct the terminal to increase or decrease the transmission power through a DCI. For this, the base station may transmit a power control command (i.e., transmission power command) to a terminal or a plurality of terminals using a common control region (e.g., a common control search space, a cell-specific search space, or a group common control resource set) belonging to a control channel.

Figure 24:
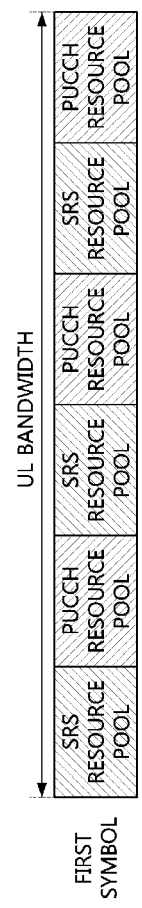
FIG. 24 is a diagram illustrating a first embodiment of configuring an SRS resource pool and a UCI channel resource pool.

Coexistence between SRS resource and UCI channel resource FIG. 24 is a diagram illustrating a first embodiment of configuring an SRS resource pool and a UCI channel resource pool.

Referring to FIG. 24, as another method in which the SRS and the UCI channel coexist, the SRS and the UCI channel may not be multiplexed in one physical resource block (PRB). A resource region in which SRSs coexist may be referred to as an SRS resource pool, and a resource region in which UCI channels (e.g., PUCCHs) coexist may be referred to as a UCI channel resource pool. The terminal may transmit the SRS resource pool and the UCI channel resource pool through frequency multiplexing (FDM).

In FIG. 24, a symbol may be located at an arbitrary position in a UL slot or may be located at a position determined by the base station through a radio resource control (RRC) signaling. The bandwidths of the SRS subbands may be different, and the bandwidths of the UCI channel subbands may be different.

The SRS resource pool may be composed of several subbands. In FIG. 24, an example of the SRS resource pool composed of three subbands is illustrated. In order to allow the terminal(s) to transmit SRSs in an SRS subband, the base station may configure the SRS subband to the terminal(s) through the RRC signaling so that the SRS subband is to be equal to or wider than the minimum bandwidth of the SRS.

The bandwidth of the SRS transmitted by the terminal may be configured by the base station through the RRC signaling. In a single SRS subband, the SRSs transmitted from several terminals may be transmitted in 1-DM or CDM manner The UCI channel resource pool may be composed of several subbands. In FIG. 24, the UCI channel resource pool is composed of three subbands. In order to allow the terminal(s) to transmit UCI channels in a UCI subband, the base station may configure the UCI subband to the terminal(s) through the RRC signaling so that the UCI subband is to be equal to or wider than the minimum bandwidth of the UCI channel. The bandwidth of the UCI channel transmitted by the terminal may be configured by the base station through the RRC signaling, and depending on the UCI type and the UCI amount, the UCI channel of a specific format may be configured by the RRC signaling. The specific UCI channel format may have a bandwidth defined by the technical specification (TS), or the bandwidth may be configured to the terminal using the RRC signaling by the base station. Alternatively, the base station may inform the terminal of the bandwidth of the UCI channel using a combination of the RRC signaling and the DL control channel.

The base station may inform the format, the frequency resource region, and the time resource region used by the UCI channel to each terminal by using the RRC signaling, the DCI, or a combination of the RRC signaling and the DCI. Thus, in a single UCI channel subband, the UCI channels transmitted from several terminals may be transmitted in FDM or CDM manner.

Figure 25:
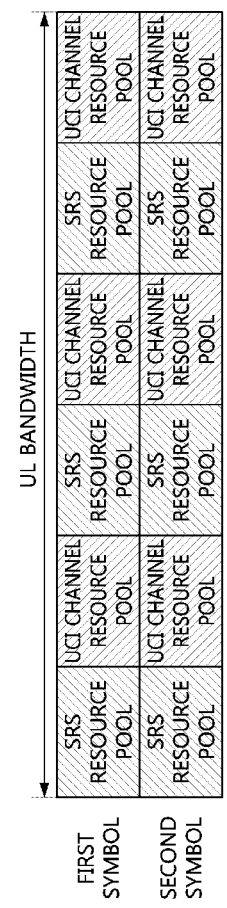
FIG. 25 is a diagram illustrating a second embodiment of configuring an SRS resource pool and a UCI channel resource pool.
Figure 26:
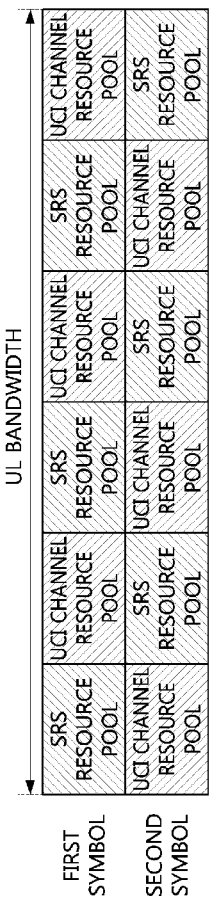
FIG. 26 is a diagram illustrating a third embodiment of configuring an SRS resource pool and a UCI channel resource pool.

FIG. 25 is a diagram illustrating a second embodiment of configuring an SRS resource pool and a UCI channel resource pool. FIG. 26 is a diagram illustrating a third embodiment of configuring an SRS resource pool and a UCI channel resource pool. The base station may allocate an SRS resource pool and a UCI channel resource pool in two or more symbols. In this case, a form in which the SRS resource pool coexists with the UCI channel resource pool may change. Such the resource pool assignments are shown in FIGS. 25 and 26. FIG. 25 illustrates a method of assigning the same resource pool in the first symbol and the second symbol. Also, FIG. 26 illustrates a method of assigning different resource pools in the first symbol and the second symbol. Here, the first symbol and the second symbol need not necessarily be consecutive in time.

Referring to FIG. 25, the frequency region of the resource pool may be maintained during two symbols without changing. It may be allowed to repeatedly transmit the SRS in the same resource (frequency and code) during two symbols. Also, it may be allowed to repeatedly transmit the UCI channel in the same resource (frequency and code) during two symbols.

The frequency diversity gain may not be obtained because the terminal repeatedly transmits using the same resource in the same subband. On the other hand, since the terminal repeats transmissions, the base station can more accurately estimate the channel and can multiplex a larger number of terminals.

As an example, the terminal may perform UL management using the SRS in two or more symbols. The terminal may maintain a precoding vector to be the same in the same frequency resource during the two symbols, and the base station may find the most favorable receive postprocessing vector (e.g., receive beamforming) by maintaining the UL in the process of receiving the SRS.

As another example, the terminal may use the same frequency resource (localized frequency resource) while transmitting the UCI channel using two symbols. Here, the base station may allocate a code resource to the terminal and apply it to the RS of the UCI channel. In this case, when a plurality of UCI channels are received in the same resource, the received UCI channels may be distinguished in a code division multiplexing (CDM) manner When different frequency resources are used in two symbols, the SRS subbands may be used differently in the first symbol and the second symbol, or even when the same SRS subband is used, the frequency resources used by the SRSs may be different. Similarly, UCI channel subbands may be used differently in the first and second symbols, or different frequency resources may be used in the same UCI channel subband. When different subbands are used for different symbols, a frequency diversity gain may be obtained.

However, when the SRS subband is maintained during two symbols, more time is required to estimate the CSI at the base station using the SRS. Also, the terminal can transmit the SRS in the entire band when using an SRS subband which has not been previously allocated by using other symbols.

FIG. 26 is a diagram illustrating a third embodiment of configuring an SRS resource pool and a UCI channel resource pool.

Referring to FIG. 26, an SRS resource pool and a UCI channel resource pool may be allocated to the first symbol, and an SRS resource pool and a UCI channel resource pool may be allocated to the second symbol. Here, the frequency resource positions of the resource pools may be changed for each symbol, and the terminal may not perform repetitive transmissions at the same frequency. Therefore, it may be difficult for the terminal to perform UL management, and may not repeatedly transmit a UCI channel using two symbols. On the other hand, the terminal may obtain the frequency diversity gain. Also, there is an advantage that the time required for the base station to obtain the CSI for the entire band is reduced using the SRS only in the subband.

Configuration of SRS Occasion

The terminal and the serving base station may perform UL management using the SRS. The serving base station may manage reception strengths of a plurality (e.g., K≥2) of ULs so that a UL between the terminal and the serving base station is not disconnected even in an environment with high blockage probability. For this purpose, one UL may be managed corresponding to one SRS. The serving base station may configure K SRS resources to each terminal, and the K SRS resources may be signaled to the terminal in form of a list in an information element of a RRC signaling.

In this case, each SRS resource configured for the terminal operates independently, so that the number of the periods, slot offsets, bandwidths, and sequence generations of the SRSs may correspond to K or less. The serving base station may compare K UL CSIs obtained from the K SRSs.

However, when the K SRSs occupy different bands and different periods, there is a disadvantage that they are not comparable in terms of the UL management. However, the present invention proposes a method for compensating for such the disadvantage.

When the terminal supports a wide UL bandwidth and is located at the coverage edge of the serving base station, the serving base station may configure the SRS to a narrow band in consideration of the power consumption of the terminal. In this case, the qualities of the two ULs measured on the SRSs received in the two subbands may not be equally compared. The reason for this may be explained as follows. Since when an SRS is transmitted in a narrow band, the terminal transmits the SRS only in one subband, a time difference between the two specific subbands through which the SRSs are transmitted may be large depending on the periods configured by the base station.

Also, the qualities of the two ULs obtained from the two SRSs measured at different times may not be equally compared because they may exceed a coherence time of the channel.

In this case, the K SRS resources may be set to have similar or the same time and frequency resources. For example, a time period in which the SRS resources are consecutively located, and a frequency section including the SRS resources may be configured.

In the same manner, when the serving base station configures K SRS resources to the terminal, the SRS resources may be implemented to occur within the specific time period and the frequency section. At this time, in order to reduce the amount of the RRC signaling, configuration parameters including at least a common period, a slot offset, a bandwidth, and the number of the antenna ports may be configured to the terminal and applied to the K SRSs. The configuration parameters corresponding to all or a part of the K SRSs may be configured to the terminal.

Figure 27:
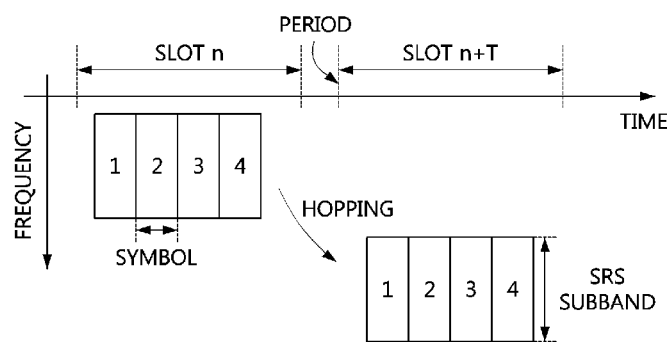
FIG. 27 is a diagram illustrating an example of an SRS occasion for a single terminal.

FIG. 27 is a diagram illustrating an example of an SRS occasion for a single terminal.

Referring to FIG. 27, resources through which the terminal may potentially transmit SRSs may be defined as an SRS burst or occasion. The serving base station may transmit an aperiodic trigger to the terminal through a DL control channel so that the terminal transmits the SRS. In this case, since it may happen that the SRS is not transmitted within the SRS occasion, a set of resources through which the terminal can transmit the SRS may be defined as the SRS occasion or a sounding resource pool. Depending on the configuration of the serving base station, such the SRS occasion may be utilized as a pool of resources shared by the terminals.

For example, the base station may configure a set of SRS resources, a resource pool, or an SRS occasion to the terminal through a RRC signaling. Also, it is possible to configure a relative position in the resource pool (or, occasion) to the terminal through the RRC signaling so as to correspond the terminal to each SRS resource. The period, slot offset, or duration of the SRS occasion may be configured to the terminal through the RRC signaling. Also, a relative symbol offset or the like for each of the K SRSs within each SRS occasion may be additionally configured to the terminal through the RRC signaling. When the duration of the SRS occasion corresponds to 1 slot, the base station may not configure the duration of the SRS occasion to the terminal. In this case, the SRS occasion may be configured separately for each serving base station (i.e., cell-specific), and each SRS resource may be configured for each terminal (i.e., UE-specific).

The serving base station may perform a radio resource management (RRM) on a reference signal received power (RSRP) or the like by using the SRS belonging to the SRS occasion. When the serving base station performs the RRM, it is preferable that the SRS is not frequency-hopped, and the serving base station may not configure the frequency hopping to the terminal.

In FIG. 27, K(=4) SRS resources correspond to 4 ULs, respectively, and the terminal may transmit SRSs in 4 consecutive symbols. Here, the period corresponds to T slots, and the frequency hopping may or may not be performed. Here, 4 SRS resources have the same bandwidth and are transmitted in the same slot. Also, the duration of the SRS occasion is exemplified as 1 slot. The terminal transmits an SRS k (k=1, 2, 3, or 4) in a symbol k, which may be transmitted in a symbol having the symbol index configured by the serving base station in a slot n. Each SRS needs not to use the same antenna port of the terminal and may not use the same SRS resource.

The serving base station may trigger such the SRS occasion to the terminal by using a DCI, or may periodically configure the terminal to transmit the SRS occasion through the RRC signaling.

Here, the SRS occasion may occupy a large amount of REs. Therefore, when the serving base station instructs a large number of terminals to perform UL management, it is possible to reduce the amount of the REs by considering the multiplexing of SRS occasions transmitted by the terminals. For this, the serving base station may configure TCs, phase modulation patterns, and the like of the SRSs belonging to the SRS occasion for the respective terminals. Here, the serving base station may configure the SRSs to be multiplexed within the same PRB. Also, the serving base station may configure a slot and a subband in which the SRS occasions occur to a common value. According to such the configuration of the serving base station, more UL resources can be allocated to UL data channels.

Dynamic Reuse of SRS Occasions and UL Data Channels

When there are a first terminal transmitting an SRS resource or an SRS occasion and a second terminal transmitting a UL data channel, the serving base station may allocate resources to the first and second terminals so that the first and second terminals use different resources. However, when a frequency hopping is performed while transmitting the SRS resource or the SRS occasion, a pattern of the frequency hopping may be different from that of a frequency hopping of the UL data channel.

Here, the pattern of the frequency hopping may include a boundary of time for performing the frequency hopping and a bandwidth of the frequency hopping. In the case of the SRS occasion, it should be able to be multiplexed with the UL data channel because it is located in the middle of the slot. When the patterns of the frequency hoppings for the SRS resources and the UL data channel are equal to each other, even if the serving base station independently allocates the SRS resource(s) to the first terminal and the UL data channel to the second terminal, their frequency resources may not be collided. However, since the patterns of the frequency hoppings are generally different, a method of avoiding such the collision is necessary in the serving base station.

The serving base station may finely schedule frequency resources of the UL data channel so as to avoid collisions with the transmission of the SRS occasion or the SRSs. However, when the time unit of the UL data channel is different from the time unit of the SRS resources, the collision may not be avoided by the scheduling. This may be commonly applied to an SRS occasion to which a frequency hopping is applied or an SRS occasion to which a frequency hopping is not applied.

The serving base station may be required to identify whether the first terminal actually transmits or does not transmit an SRS in the SRS occasion transmitted by the first terminal. The SRS occasion is a resource through which the first terminal can potentially transmit an SRS. Therefore, in the case that the first terminal transmits an SRS based on a trigger of the serving base station, the serving base station may not give any trigger to the first terminal so that the first terminal does not transmit an SRS in the SRS occasion. In this case, the serving base station may allocate resources corresponding to the SRS occasion to the UL data channel of the second terminal. For this, the serving base station may allocate a resource including the SRS occasion to the second terminal as a UL data channel resource by using a DL control channel for scheduling of the second terminal. In addition, the serving base station may inform the second terminal of whether the first terminal actually uses or does not use resources corresponding to the SRS occasion.

As an example, the serving base station may instruct the second terminal to adjust the mapping and coding rate of the UL data channel for a specific SRS occasion by including a bitmap in the DL control channel. Each bit of the bitmap may correspond to each SRS occasion.

Figure 28:
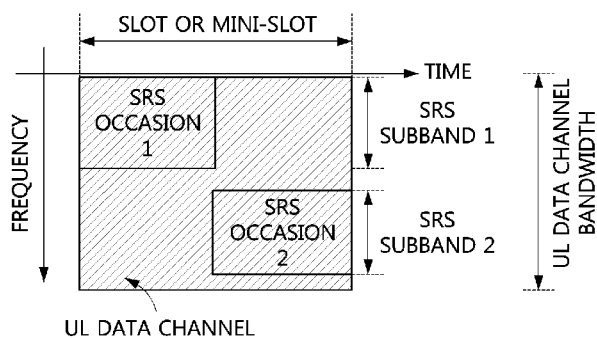
FIG. 28 is a diagram illustrating a first embodiment of multiplexing an uplink data channel and an SRS occasion.
Figure 29:
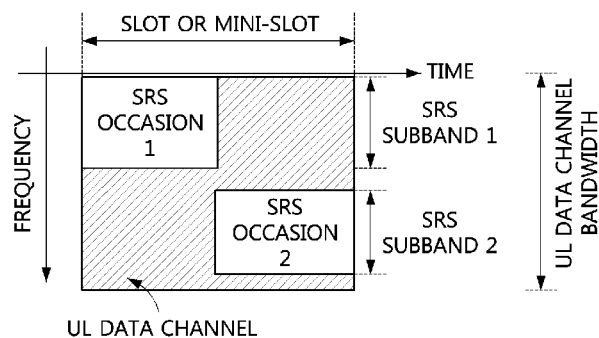
FIG. 29 is a diagram illustrating a second embodiment of multiplexing an uplink data channel and an SRS occasion.
Figure 30:
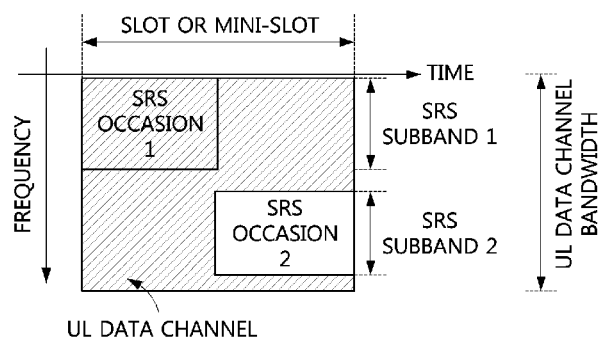
FIG. 30 is a diagram illustrating a third embodiment of multiplexing an uplink data channel and an SRS occasion.

FIG. 28 is a diagram illustrating a first embodiment of multiplexing an uplink data channel and an SRS occasion. FIG. 29 is a diagram illustrating a second embodiment of multiplexing an uplink data channel and an SRS occasion. FIG. 30 is a diagram illustrating a third embodiment of multiplexing an uplink data channel and an SRS occasion.

Referring to FIGS. 28 to 29, a time region during which the frequency hopping is not applied to the UL data channel, or a time region during which the frequency hopping is applied to the UL data channel but the UL data channel is not frequency-hopped may be considered. The serving base station may configure one or more SRS occasions. Even in the case of a single SRS occasion, when a frequency hopping is applied to the SRS occasion, it may be interpreted that the resource pattern changes from a first SRS occasion to a second SRS occasion. Thus, by using two or more time and frequency resources, it may be possible to place a first SRS occasion and a second SRS occasion within a slot (or mini-slot).

FIG. 28 illustrates a method in which all resources of an SRS occasion are allocated to the UL data channel. Also, FIG. 29 illustrates a method in which all resources of an SRS occasion are not allocated to the UL data channel. As shown in FIG. 28 and FIG. 29, in response to an instruction from the serving base station, the terminal may map the UL data channel to REs, and perform rate matching on UL data.

Even if a second terminal does not transmit an SRS, when resource allocation information on the first SRS occasion and the second SRS occasion is known to the second terminal, the UL data channel may be mapped to REs as shown in FIGS. 28 and 29.

On the other hand, when the second terminal does not know the resource allocation information on the first SRS occasion or when whether to reuse the first SRS occasion is different from whether to reuse the second SRS occasion, the UL data channel may be mapped to REs as shown in FIG. 30.

In FIG. 30, a method, in which a part of resources in the SRS occasion are allocated to the UL data channel, and the remaining part of resources are not allocated to the UL data channel, is illustrated. FIG. 30 illustrates an example in which the first SRS operation is allocated to the UL data channel and the second SRS occasion is not allocated to the UL data channel.

Allocation of Time Resources

The base station may indicate, to the terminal, a portion of a radio resource for transmitting a UCI channel through a higher layer signaling or through a combination of a higher layer signaling and a DL control channel. Also, the base station may indicate to the terminal the position of the radio resource for transmitting the UCI channel using a DCI.

The time resource may be comprised of one or more UL sub-slots, and the corresponding sub-slot may include a last symbol of a UL slot, or may be located in the middle of the corresponding UL slot. In the case of being used for a precoding-based wireless communication in a high frequency band (e.g., 6 GHz or above), the sub-slot may be constituted by a single symbol. On the other hand, in the case of a low-frequency band (e.g., below 6 GHz), the sub-slot may also be configure with a single symbol, and the sub-slot may mean a last symbol of a UL slot. As shown in FIG. 13, the present invention may be applied to both of a DL-centric slot or a UL slot, so that it may be applied without distinguishing between FDD and TDD.

The base station may measure UL reception powers of the terminal and control the terminal to have appropriate transmission powers. Also, the base station may indicate the number of sub-slots for transmitting the UCI channel to the terminal by using a higher layer configuration or a combination of a higher layer configuration and a DL control channel. Considering a burst transmission (e.g., a UCI channel burst or a UCI channel occasion) in which the base station transmits the UCI channel several times, the size of a time resource occupied by one burst transmission may correspond to a sub-slot. Also, multiple burst transmissions may correspond to aggregation of sub-slots.

When a plurality of UL sub-slots are aggregated, boundaries of UL slots or UL-centric slots may not be necessarily aligned. Thus, it may be allowed to terminate the transmission of the UCI channel in a sub-slot located in the middle of the next slot beyond the corresponding slot. In this case, since the base station obtains sufficient reception power from the terminal, the transmission energy of the terminal can be saved, the UL radio resource can be utilized for other purposes, and unnecessary UL interferences can be suppressed.

Figure 31:
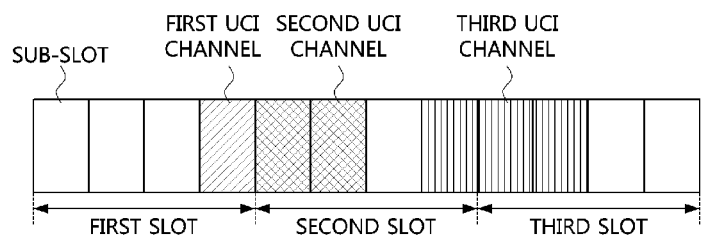
FIG. 31 is a diagram illustrating an example of a UCI channel to which sub-slot aggregation is applied.

FIG. 31 is a diagram illustrating an example of a UCI channel to which sub-slot aggregation is applied.

Referring to FIG. 31, one slot may be composed of several sub-slots. In FIG. 31, an example in which one slot is composed of 4 sub-slots is illustrated. The length of each sub-slot may be indicated to each terminal by the base station through a higher layer signaling, or through a higher layer signaling and a DL control channel. A first UCI channel located in a first slot is not subjected to a sub-slot aggregation, and the UCI channel transmission method (Method 1) not using the RS, described above with reference to FIGS. 3 to 5, may be applied. Also, the UCI channel transmission method (Method 2) using the RS, described above with reference to FIGS. 6 to 8, may be applied.

The base station may configure a second UCI channel by aggregating some or all sub-slots belonging only to a second slot. As an example of utilizing such the second UCI channel, the terminal may apply the UCI channel transmission method (Method 1) not using the RS and the UCI channel transmission method (Method 2) using the RS to generate the second UCI channel. Also, by using channel coding, the terminal may transmit a large amount of UCI of 3 bits or more, instead of 1 bit or 2 bits, through the UCI channel.

As another example of utilizing the second UCI channel, when the terminal performs the UCI channel burst transmission, the terminal may perform the repetitive transmissions the number of times corresponding to the number of aggregated sub-slots, and thus the base station may improve the reception quality. The aggregation of sub-slots may end at a boundary of a slot, but the aggregation of the sub-slots may not necessarily end at a boundary of a slot.

A third UCI channel is composed of 3 sub-slots, but sub-slots belonging to both the second slot and the third slot may be used. After obtaining sufficient reception quality, the base station does not need to instruct the terminal to transmit the UCI channel any more, so that the third UCI channel may not include up to the last sub-slot of the third slot.

Allocation of Frequency Resources

The base station may indicate, to the terminal, a position of a frequency resource in a radio resource. The base station may indicate, to the terminal, the frequency resource position of the radio resource through a higher layer signaling or through a higher layer signaling and a DL control channel. The frequency resource position may be explicitly indicated using the DL control channel or the frequency resource position may be derived using a parameter included in the DL control channel.

For example, in the case of a UCI channel that uses only one symbol, since only one symbol is used, the UCI channel does not perform frequency hopping. Also, the base station may configure the position of the frequency resource used by the UCI channel to the edge of the UL spectrum. When the base station allocates UL data channels to terminals, the complexity of scheduling may be reduced. In particular, in the case of a UL data channel using the DFT-s-OFDM, it may be advantageous for lowering PAPR to schedule the UL data channel to an adjacent band. Therefore, in order to allocate a large transmission amount to the terminal, a wide bandwidth should be adjacently scheduled. On the other hand, in the case of a UL data channel using the CP-OFDM, even if the UL data channel is not scheduled to an adjacent band, the PAPR may not be further increased. Therefore, even if multiple narrow bandwidths are scheduled without scheduling a wide bandwidth adjacent to each other, a large transmission amount can be allocated to the terminal. Here, if the wide bandwidth is scheduled, the base station may more effectively use the DM-RS of the UL data channel to improve the reception quality.

Transmission of a UCI channel composed of a single symbol may be allowed to a terminal located in a good location in uplink coverage, only when sufficient reception quality is obtained even if the base station transmits the UCI channel with a single symbol. Since the UL bandwidths configured for the terminals may be different from each other, the base station may configure the edges of the UL bandwidths recognized by the terminals to coincide with each other. This principle may be applied not only to UCI channels using only one symbol but also to transmission of other general UL channels.

Figure 32:
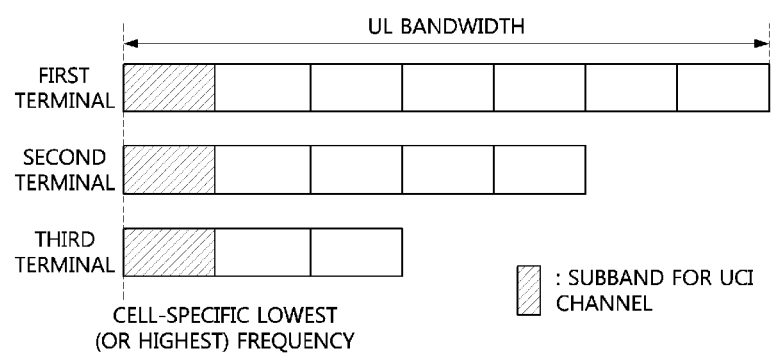
FIG. 32 is a diagram illustrating an example of a subband for a UCI channel in an uplink bandwidth configured for a terminal.
Figure 33:
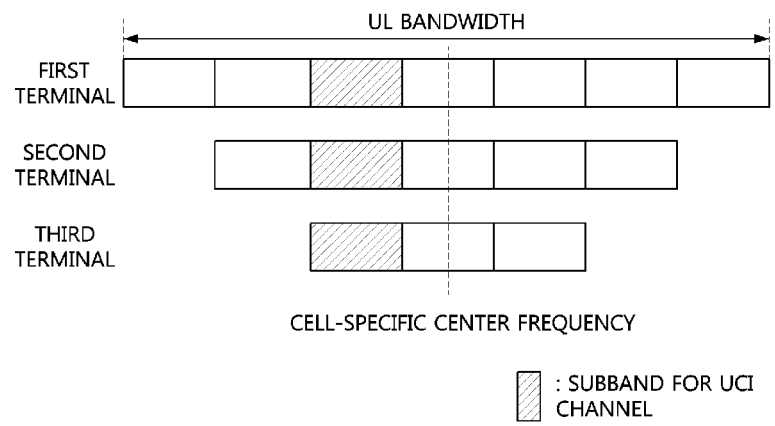
FIG. 33 is a diagram illustrating another example of a subband for a UCI channel in an uplink bandwidth configured for a terminal.

FIG. 32 is a diagram illustrating an example of a subband for a UCI channel in an uplink bandwidth configured for a terminal. FIG. 33 is a diagram illustrating another example of a subband for a UCI channel in an uplink bandwidth configured for a terminal. In FIGS. 32 and 33, terminals using only one symbol and having different UL bandwidths are shown. Here, bandwidths narrower than the UL system bandwidth operated by the base station may be configured to the terminals (i.e., UE-specific UL bandwidth).

Referring to FIG. 32, although the UL bandwidths of the terminals are different from each other, the same edge may be shared by using the lowest PRB index. In FIG. 32, a hatched portion denotes a subband through which a UCI channel can be transmitted. In the same subband region, the terminal may schedule or configure UCI channels to be multiplexed and other UL channels to not use the corresponding frequency region. That is, the base station may schedule the UL or configure the terminals so that other UL channels are not multiplexed in the subband of the UCI channel.

Referring to FIG. 33, terminals may share the same center frequency with different bandwidths. In FIG. 33, a hatched portion denotes a subband through which a UCI channel can be transmitted. In the same subband, UCI channels of the terminals may be multiplexed. Also, UL data channels may be multiplexed. The base station may set different UL bandwidths according to capabilities of the terminals. Therefore, if the center frequency is shared by the base station (or serving cell), the UCI channel subbands of some terminals may be located at the edge of the system band, but the UCI channel subbands of other terminals may be located in the middle of the system band.

Here, the UCI channel subband may mean a frequency region in which one or more terminals transmit UCI channels. The base station may configure one or more formats for the terminal, and the terminal may apply a different format according to the type and size of the UCI that the terminal intends to transmit. The terminal may use the same subband according to the format of the UCI channel, or may use a different subband according to the format of the UCI channel. In this case, the terminal may transmit a UCI channel format 1 in a first subband and not in a second subband.

The base station may receive a UL data channel or receive an SRS through the UCI channel subband, according to configuration or scheduling of the base station, instead of receiving only the UCI channel through the UCI channel subband.

As shown in FIG. 32, the base station may allocate the frequency resources used by the terminals as aligned to the edge of the system band, and allocate wide band physical channels and physical signals to the remaining frequency resources. For example, in the case of a terminal (e.g., a first terminal) that transmits a UL data channel in the DFT-s-OFDM waveform, a large transmission amount can be transmitted using a wide bandwidth. Even when transmitting an SRS, a terminal centered on the coverage of the base station may transmit the SRS in a wide band, so that the base station may obtain a UL CSI in a short time. Also, in the UCI channel subband, the base station may configure only UCI channels to be transmitted. Therefore, there is no need to consider multiplexing of the UCI channel and the UL data channel, nor multiplexing of the UCI channel and the SRS.

On the other hand, as shown in FIG. 33, the base station may make the center frequencies of the terminals coincide with each other. Here, the UCI channel subband may be located at the middle of the frequency for a certain terminal (e.g., the first terminal) but may be located at the edge of the frequency for other terminals (e.g., the third terminal). In this case, since the UCI channel can be transmitted in the middle region of the UCI channel subband, multiplexing of the UL data channel and the UCI channel or multiplexing of the UCI channel and the SRS may be considered. Also, a UL scheduler may instruct the terminal to use the CP-OFDM instead of the DFT-s-OFDM to transmit the UL data channel, thereby improving the PAPR.

Figure 34:
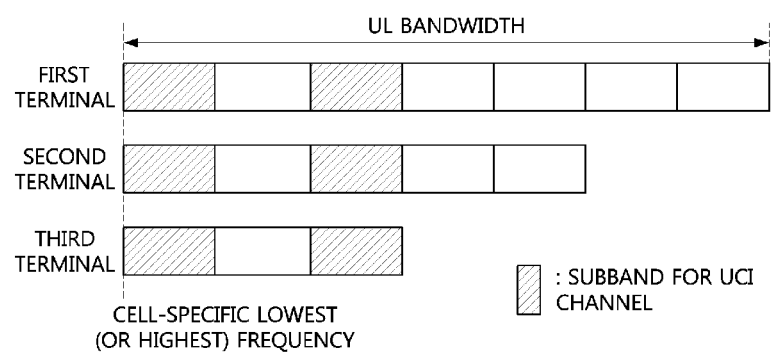
FIG. 34 is a diagram illustrating an uplink band allocation method for aligning the edges of frequencies.
Figure 35:
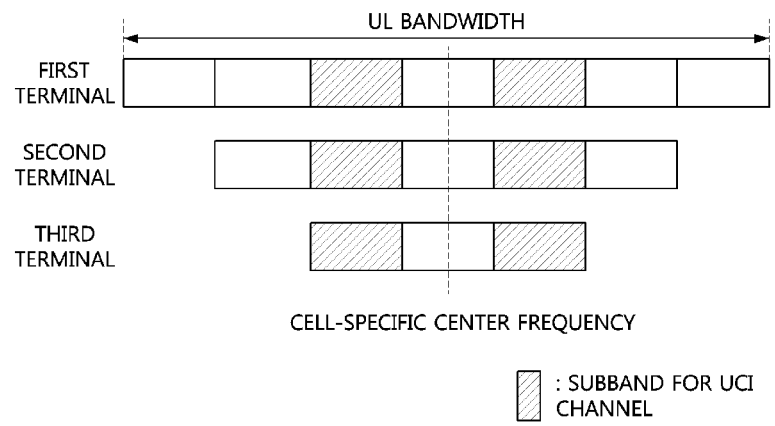
FIG. 35 is a diagram illustrating an uplink band allocation method in which the centers of frequencies are made coincide with each other.

FIG. 34 is a diagram illustrating an uplink band allocation method for aligning the edges of frequencies. FIG. 35 is a diagram illustrating an uplink band allocation method in which the centers of frequencies are made coincide with each other.

Referring to FIGS. 34 and 35, a UCI channel using two or more symbols may be considered. For example, in the case of using two symbols, in order to obtain a frequency diversity gain, the terminal may not perform frequency hopping by using several clusters, or the terminal may perform frequency hopping by using a single cluster. When the base station configures different bandwidths for the terminals, frequency hopping may be considered. In this case, it is preferable that the UCI channel transmitted by the terminal is not located only at the edge of the UL frequency.

Since the UCI channels frequency-hopped by the base station to different bandwidths may not be multiplexed, in the case of assuming frequency hopping, the UCI channel may use two or more UL frequency bands. Accordingly, in this case, the base station may multiplex the UL data channel and the UCI channels or configure the terminals to transmit the UCI channels by distinctively allocating predetermined frequency resources to the terminals. For example, the base station may configure at least one frequency resource (e.g., frequency resource for the UCI channel) to the terminal through a higher layer signaling, and transmit to the terminal information indicating at least one among the at least one frequency resource configured through the higher layer signaling by using a DL control channel.

In order to multiplex only the UCI channels, it is possible to consider a case where the base station distinctively configures a subband for the terminals. In order to configure a common frequency resource to the terminals, as shown in FIGS. 34 and 35, the base station may configure the frequency hopping of the UCI channel with the narrowest bandwidth. Here, as shown in FIG. 34, the base station may allocate the UL bandwidths by aligning frequency edges. Also, as shown in FIG. 35, the base station may allocate the UL bandwidths by making the center frequencies coincide with each other.

When the terminal performs frequency hopping of the UCI channel, the frequency resource of the UCI channel may be designated as follows. The terminal may transmit the UCI channel within an active UL bandwidth part (active UL BWP). For this, the serving base station may inform the terminal of the active UL BWP to which the UCI channel belongs. The active UL BWP may be one of a plurality of UL BWPs that the serving base station configures to the terminal through a higher layer signaling (e.g., RRC signaling). The configuration information of the UL BWP may be transmitted through the higher layer signaling, and the configuration information of the UL BWP may include information indicating a set of frequency resources for the UCI channel (or, subband of the UCI channel). Accordingly, the terminal may identify the frequency resource for the UCI channel based on the configuration information of the UL BWP acquired through the higher layer signaling.

In addition to allocation information of a DL data channel, allocation information (e.g., UL BWP) of a UCI channel for transmitting a HARQ response (e.g., HARQ-ACK bit) for the DL data channel may be transmitted through the DL control channel. For this, the serving base station may collectively inform the terminal of a DL BWP and the UL BWP. Alternatively, the serving base station may independently inform the terminal of the DL BWP and the UL BWP, respectively. In this case, the terminal may identify the active UL BWP based on the UL BWP indicated by the serving base station, and determine, based on the identified information, the frequency resource to be actually used among the set of frequency resources usable by the UCI channel.

However, the allocation information of the active UL BWP may not always be signaled through the DL control channel through which the allocation information of the DL data channel is transmitted. For example, only the allocation information of the active DL BWP may be signaled without the allocation information of the active UL BWP through the DL control channel. In this case, the terminal may reuse the most recently received allocation information of the active UL BWP to estimate the UL subband to be used for transmission of the UCI channel. The terminal may perform frequency hopping using frequency resources for the UCI channel defined in the UL BWP.

However, in the manner described above, the active UL BWP may not be dynamically adjusted. Since the capabilities of the terminals are different and the number of available bits to indicate the active UL BWP is limited, there may be a case where the resolution is insufficient to indicate the same frequency resources. In this case, the frequency resource for the UCI channel may be indicated by other information and signaling instead of the allocation information of the active UL BWP. The terminal may obtain information on the first frequency resource and the second frequency resource of the UCI channel from the serving base station for frequency hopping.

For example, the serving base station may configure the terminal to transmit the UCI channel based on frequency hopping through a higher layer signaling, and provide information on frequency resources used for frequency hopping of the UCI channel (e.g., information on the first frequency resource and the second frequency resource, and the like) to the terminal through a higher layer signaling. The range of the first frequency resource may be the same as the range of the second frequency resource. The serving base station may inform the terminal of a set of frequency resources for the UCI channel through a higher layer signaling, and may transmit information on at least one frequency resource (e.g., frequency resource used for transmission of the UL control channel) belonging to the set of frequency resources indicated by the higher layer signaling to the terminal through a DL control channel. Here, the information on the second frequency resource may be transmitted separately from the information on the first frequency resource. For example, the serving base station may transmit the allocation information of the DL data channel and the information on the second frequency resource together through the DL data channel. Such the information may indicate that the UCI channels of different terminals use the same frequency resource, and thus the multiplexing of the UCI channel may be intended.

As another method, the base station may acquire a UL CSI using an SRS transmitted by the terminal, and the base station may be assumed to know the position of the frequency resource having the highest channel quality at the base station. The base station may estimate the UL channel with the terminal if the base station triggers the terminal to transmit the SRS or configures the terminal to periodically transmit the SRS. In this case, the base station may indicate, to the terminal, the position of the frequency resource of the radio resource to which the UCI channel is mapped by using a DL control channel.

As an example, the position of the frequency resource of the UCI channel may be indicated as the position of the frequency resource in the sounding resource is indicated to the terminal by the base station through the higher layer signaling. Here, an RRC parameter having the same function as the sounding resource may be utilized. The base station may allow the terminal to derive the position of the frequency resource of the UCI channel based on a predetermined equation by using a value of a TC, a bandwidth configuration variable (i.e., BandwidthConfig), a bandwidth variable (i.e., Bandwidth), a frequency hopping bandwidth variable (i.e., HoppingBandwidth), frequency domain position information (i.e., freqDomainPosition), or the like. Here, as an example of the equation applied here, the equation defining the frequency resource position of the sounding resource in TS 36.211 to TS 38.211 may be applied, or a part of the equation may be modified and applied.

As another example, the base station may transmit a DL control channel to transmit a DL data channel to the terminal. In this case, the frequency resource of the UCI channel may be indicated to the terminal using a bit field included in the DL control channel. The frequency resource may be expressed in two steps, and it may correspond to the index of the UCI channel subband that the terminal should use and the frequency resource of the UCI channel applied within the subband.

The bit field in the DL control channel of the base station may also be composed of two types. Here, the base station may firstly indicate to the terminal the UCI channel subband or the index of the UCI channel subband, and may secondly indicate to the terminal the UCI channel subband or the index within the subband. These two indexes may be used for other purposes in the DL control channel. For example, the index indicating the UCI subband may be expressed by reusing the field indicating the resource related to the SRS. Here, the base station may adjust PRB allocations so that a single frequency index has a distributed PRB allocation.

Frequency Multiplexing

A case that the terminal is required to transmit the UCI channel before the base station configures a sounding resource to the terminal may occur. In this case, the terminal may transmit the UCI channel so as to obtain a multiplexing gain. The base station may configure a time resource unit or a frequency resource unit used for the frequency multiplexing in consideration of coexistence of UCI channels, coexistence with uplink data channels, or coexistence with sounding resources. Here, the time resource unit may be a symbol or a sub-slot, and the frequency resource unit may be a subcarrier, an RB, a subband, or a BWP.

As an example of a method for obtaining the multiplexing gain, a single cluster transmission may be considered. Although the data is temporally transmitted one or two times, the UCI channel transmitted by the terminal may use different frequency resources in units of one or more symbols or sub-slots (frequency hopping). Here, the applied frequency resources may include a starting position and a bandwidth of the frequency for transmitting the UCI channel, and a numerology (e.g., a subcarrier spacing, a cyclic prefix length) of a waveform used by the UCI channel may be applied identically to a numerology used by the data channel.

The frequency resource signaling method may use at least one predefined value in the standard as it is, or may use at least one value indicated to the terminal through only a higher layer signaling or a combination of a higher layer signaling and a DL control channel. In the case of an initial access step in which the base station does not perform the higher layer configuration (e.g., RRC configuration), the terminal may use the value defined in the standard (i.e., TS), or use the frequency resource of the UCI channel identified from system information. After the base station configures the higher layer to the terminal, the base station may indicate the frequency resource of the UCI channel by a combination of the higher layer signaling and the DL control channel. The base station may transmit the DL control channel as a group common control channel. In the case of the UCI channel for transmitting a HARQ-ACK, the base station may indicate the frequency resource of the UCI channel in a DL control channel for scheduling a DL data channel.

For example, in the DL control channel for scheduling a DL data channel, the base station may indicate the time resource and the frequency resource of the UCI channel transmitting the HARQ-ACK by using m bits. In this case, the base station may configure $2^m$ time resources and frequency resources of the UCI channel to the terminal by the higher layer signaling. For this, the base station is required to have sufficient channel information of the frequency band by receiving the SRS from the terminal in advance, and may indicate, based on the channel information, the frequency resource of the UCI channel to the terminal using the bits included in the DL control channel. Here, since the base station instructs the terminal to transmit the UCI channel by applying frequency selective scheduling, the terminal may perform a single cluster transmission. However, in a scenario in which the reception quality of the UCI channel is to be further increased or the UCI channel is periodically transmitted, the base station may configure the terminal to perform single or multiple cluster transmission.

Meanwhile, when the UCI channel is composed of 1 sub-slot and the corresponding sub-slot is composed of two or more symbols, a frequency diversity may be obtained by transmitting the UCI channel so that the subcarrier index sets are different from symbol to symbol or the subcarrier index sets are different from each other in different symbol sets even when the set of consecutive symbols has the same subcarrier index set. When the UCI channel is composed of two or more sub-slots, the terminal may obtain the frequency diversity by transmitting the UCI channel by configuring frequency resources of the respective sub-slots to be different from each other.

As an example, in the case of the UCI channel using two symbols in FIGS. 6 to 8, different subcarrier sets or RB sets may be used for each symbol. In the case of the third UCI channel in FIGS. 9 and 10, the first sub-slot, the second sub-slot and the third sub-slot constituting the third UCI channel may be transmitted using different subcarrier sets or RB sets.

Figure 36:
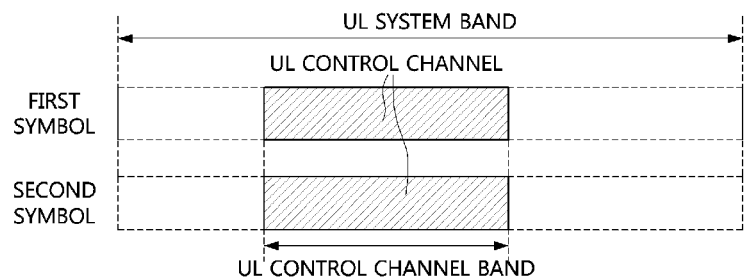
FIG. 36 is a diagram illustrating an example of a UCI channel using the same subband.
Figure 40:
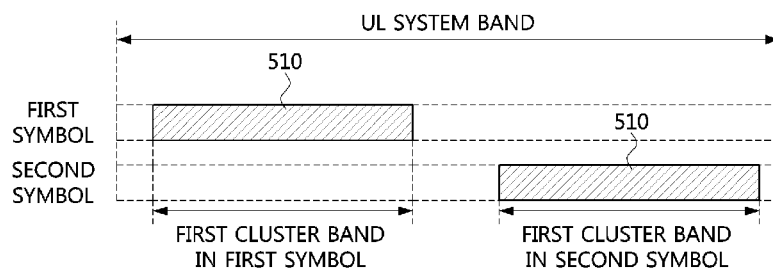
FIG. 40 is a diagram illustrating an example of a UCI channel using different subbands.

The subcarrier sets or RB sets used by the UCI channel may be different from each other or may be the same according to the configuration of the base station. An example of the UL control channel transmitted using the same subband is shown in FIG. 36. On the other hand, an example of the UL control channel transmitted using different subbands is shown in FIG. 40.

The base station may configure the subbands of the UL control channel, which are used by the first symbol and the second symbol, to be equal to each other. As a first method for signaling the subbands of the UL control channel to the terminal, the base station may explicitly indicate that the frequency resources of the first symbol and the second symbol are the same. Also, as a second method for signaling the subbands of the UL control channel to the terminal, the base station may configure the UCI channel using two symbols or one sub-slot to the terminal. In this case, the terminal may implicitly understand that the UCI channel is to be transmitted through the same frequency resource. Here, the base station may configure two or more symbols in the single sub-slot. Hereinafter, an example in which one sub-slot is composed of two symbols will be described.

Figure 37:
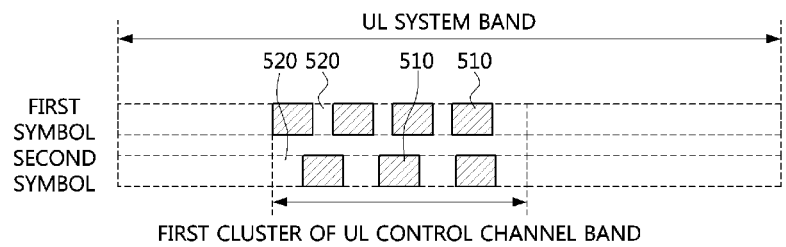
FIG. 37 is a diagram illustrating an example of a UCI channel in which different ZP-RS resources are configured for each symbol in the same subband.

FIG. 37 is a diagram illustrating an example of a UCI channel in which different ZP-RS resources are configured for each symbol in the same subband.

Referring to FIG. 37, the terminal may perform different rate matching on all symbols belonging to the UCI channel 510. That is, the terminal may perform different coding rate matching for each symbol. Interference between the sounding resources configured by the base station to other terminals and the UCI channel may be generated. The terminal transmitting the UCI channel according to the present invention may utilize a set of subcarriers capable of avoiding the sounding resources according to the configuration of the base station.

In this case, the base station may indicate to the terminal a TC to be used in the UCI channel in the symbol constituting the UCI channel 510. Also, the base station may indicate to the terminal a TC that should not be used. Here, a higher layer signaling may be used when the base station indicates the available TC to be used or the TC that should not be used. The base station may configure a set of unused subcarriers or ZP-RS 520 to the terminal in order to indicate the TC that should not be used.

By avoiding the unused subcarriers or the ZP-RS 520, the terminal may encode the UCI channel and map the UCI channel to REs, or encode the UL data channel and map the UL data channel to REs. For example, when the base station configures a ZP sounding resource to the terminal, the terminal may not map the ZP sounding resource to REs. Also, the terminal may perform encoding or spreading suitable for the set of the remaining subcarriers belonging to the subband.

FIG. 37 illustrates an example of a method of mapping the UCI channel to the set of subcarriers belonging to the subband by avoiding the ZP-RS 520 when the terminal transmits the UCI channel in one or more clusters. In the case that the terminal encodes or spreads the UCI using the ZC sequence, the coding rate, the spreading gain, or the length of the ZC sequence and the TC may differ from symbol to symbol.

The method of applying a different rate matching per symbol may be applied to both of the UCI channel transmission method using the RS (Method 1) described above with reference to FIGS. 3 to 5, and the UCI channel transmission method not using the RS (Method 2) described above with reference to FIGS. 6 to 8.

Hereinafter, as shown in FIG. 7, the UCI channel transmission method (Method 2), in which RSs are transmitted in all symbols, will be described as an example.

Figure 38:
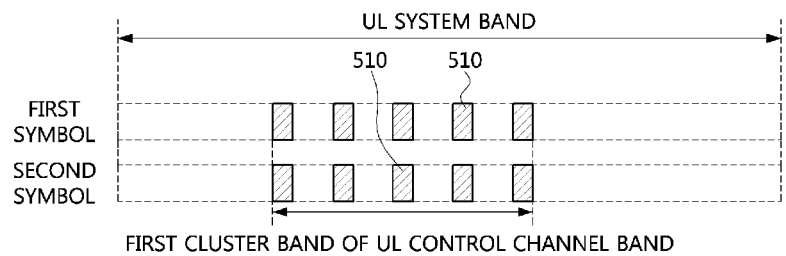
FIG. 38 is a diagram illustrating an example of a UCI channel using a RS with the same subcarrier set in the same subband.

FIG. 38 is a diagram illustrating an example of a UCI channel using a RS with the same subcarrier set in the same subband.

Referring to FIG. 38, in the subband used by the UCI channel, the terminal may distinguish a set of subcarriers through which the RS 510 of the UCI channel is transmitted and a set of subcarriers through which the UCI of the UCI channel is transmitted. Here, all the frequency resource positions of the RS 510 of the UCI channel may be set to be the same. Since the subcarriers for transmitting the RS 510 of the UCI channel are the same, when the first symbol and the second symbol are consecutive or not far apart, orthogonal sequence codes may be applied in the time domain.

For example, the base station may indicate [1, −1] as an orthogonal sequence (OCC) to the first terminal and [1, 1] as an orthogonal sequence to the second terminal. In this case, the base station may distinguish the UCI channel of the first terminal from the UCI channel of the second terminal using the orthogonal sequence codes. Since the terminal transmits the RS 510 of the UCI channel in the same set of subcarriers, the base station may more accurately estimate the channel value in the corresponding set of subcarriers. Accordingly, the base station may configure the transmission power of the UCI channel RS 510 to be constantly lowered. That is, the power consumption of the terminal can be reduced.

Figure 39:
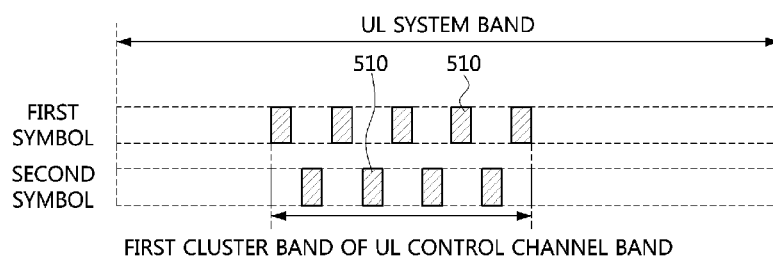
FIG. 39 is a diagram illustrating an example of a UCI channel using a RS with different subcarrier sets in the same subband.

FIG. 39 is a diagram illustrating an example of a UCI channel using a RS with different subcarrier sets in the same subband.

Referring to FIG. 39, the terminal may configure positions of subcarriers for transmitting the RS 510 of the UCI channel differently for each symbol.

The base station may receive the RS 510 of the UCI channel transmitted in different symbols and different subcarriers, and may perform channel estimation using the RS 510 of the received UCI channel. Then, the base station may apply interpolation to estimate the channel experienced by the REs of the UCI. Since the REs of the RS are scattered in the time and frequency domains of the UCI channel, the error due to the interpolation may be smaller than that of the case where the subcarriers of the RS 510 of the UCI channel are set to the same, which was described with reference to FIG. 38. That is, the channel estimation accuracy of the base station can be improved through the channel interpolation.

FIG. 40 is a diagram illustrating an example of a UCI channel using different subbands.

Referring to FIG. 40, identically to the method of using the same subband for each symbol, the terminal may allocate the RS 510 of the UCI channel when different subbands are used. Here, the RS 510 of the UCI channel may be arranged in each of a first cluster band of the first symbol and a cluster band of the second symbol. The terminal may transmit the UCI channel in which the RS 510 is arranged to the base station.

The terminal may perform a single cluster transmission in a single symbol corresponding to the same time resource. The terminal may apply different TCs and different bandwidths to the first cluster transmitted in the first symbol and the second cluster transmitted in the second symbol. Meanwhile, when the terminal continuously transmits the first symbol and the second symbol, the transmission power configured by the base station may be the same for the two symbols. Alternatively, a predetermined transmit power may be applied to the first symbol, and a transmit power having a difference (e.g., power offset) from the predetermined transmission power may be applied to the second symbol. Here, the power offset may be preferably configured to a value sufficiently small to reduce interference between the first symbol and the second symbol.

Figure 41:
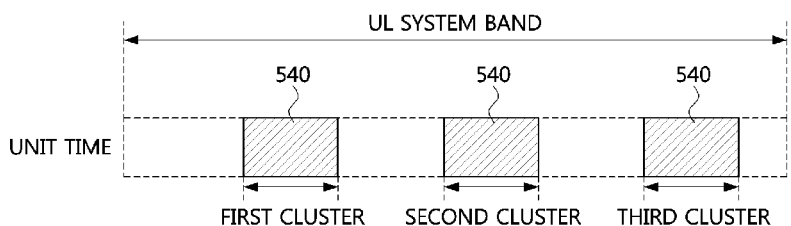
FIG. 41 is a diagram illustrating a multiple cluster transmission method for obtaining a multiplexing gain.

FIG. 41 is a diagram illustrating a multiple cluster transmission method for obtaining a multiplexing gain. In FIG. 41, a UCI channel using three clusters is shown as an example.

Referring to FIG. 41, the terminal may utilize UCI resources using one or more continuous frequency units (hereinafter referred to as 'clusters') in a frequency domain (multi-cluster transmission). Here, the terminal may transmit the same symbol or the same sub-slot in unit time. Since the PAPR of the terminal may increase when such the transmission method is applied, an operation power of a power amplifier used by the terminal may be lowered, and the multiplexing gain in the frequency domain may be obtained instead. Through this, the base station may obtain an SINR gain.

As an example, in addition to applying the multiple cluster transmission method, the terminal may transmit the UCI channel to the base station without including RSs in all clusters.

As another example, in addition to applying the multiple cluster transmission method, the terminal may transmit the UCI channel to the base station by including RSs in all clusters.

As yet another example, in addition to applying the multiple cluster transmission method, the terminal may transmit the UCI channel to the base station without including RSs in one cluster among three clusters, and with including RSs in the other two clusters.

In order to generate a cluster 540 belonging to the UCI channel, the terminal may generate resources such as bandwidth, sequence, etc. in the same manner as the SRS, and may consider coexistence with sounding resources or UCI channels of other terminals through this.

The base station may inform the terminal of resources of each cluster used by the terminal through a higher layer signaling or a combination of a higher layer signaling and a DL control channel. Here, as a first method for determining the length of a sequence to be used in a sounding resource, the length of a sequence used in a sounding resource may be determined to be a sum of a bandwidth of the first cluster, a bandwidth of the second cluster, and a bandwidth of the third cluster. As a second method for determining the length of a sequence to be used in a sounding resource, the length of a sequence used in a sounding resource may be determined so that a first sounding resource corresponds to the first cluster, a second sounding resource corresponds to the second cluster, and a third sounding resource corresponds to the third cluster.

In the first method for determining the length of a sequence to be used in a sounding resource, the sequence of the RS or the sequence applied to the UCI may be mapped as regarded as one resource unit over the multiple clusters and may be mapped. Also, in the second method for determining the length of a sequence to be used in a sounding resource, the sequence of the RS or the sequence applied to the UCI may be mapped as regarded as one resource unit for each cluster.

The size of the transmission power applied to the respective clusters by the terminal may follow the configuration of the base station, and the transmission power of each of the clusters may vary depending on the transmission power used for the sounding resources in the subband to which each cluster belongs. However, since this method may increase the amount of control information of the base station, it is desirable to configure the transmission power of all the clusters to have the same size.

The terminal may transmit the UCI channel in a single cluster or multiple clusters if the terminal does not receive a separate indication from the base station. Here, the separate indication may be configured by the base station to the terminal through a higher layer signaling. Alternatively, the separate indication may be included in a DL control channel used by the base station for scheduling DL data.

As an example, when the terminal performs periodic CSI feedback and scheduling request, the terminal may not receive the separate indication from the base station. Here, in the case of transmitting by the number of clusters already configured or activated, and in the case that the terminal feeds back the HARQ-ACK, the terminal may receive the separate indication for the DL data channel from the base station. Therefore, the terminal may consider transmitting the UCI channel by using a single cluster or by using multiple clusters according to an instruction of the base station.

As another example, when the terminal has to transmit CSI and HARQ-ACK in the same UCI channel, the terminal may receive the separate indication from the base station. When the terminal receives such the indication, the terminal may derive a frequency resource (e.g., a cluster index) within the uplink system band of the terminal. Also, when the terminal receives such the indication, the terminal may derive a time resource (e.g., a sub-slot index or a symbol index) within the corresponding slot. Also, when the terminal receives such the indication, the terminal may derive a frequency resource (e.g., a cluster index) within the UL system band of the terminal.

Even after the base station configures the sounding resource to the terminal, both the coexistence with the sounding resources and the multiplexing of the UCI channel may be considered. For this, the terminal may use one or more clusters. The terminal may transmit the UCI channel using multiple clusters in one or more unit times, where the unit time may be a symbol or a sub-slot. On the other hand, the terminal may use different clusters for each unit time. In the case of configuring transmission resources of the UCI channel to be multiple clusters, the multiple clusters may be used in one unit time. Here, one of the resource configuration methods described with reference to FIGS. 36 to 40 may be applied to configure the resources used by one cluster.

Coexistence of UCI Channels

The coexistence between UCI channels may be considered, and each terminal may transmit each UCI channel in the same time resource and frequency resource. In order to distinguish such the UCI channels, the base station may allocate a unique phase modulation pattern (i.e., UE-specific cyclic shift) to each of the terminals through a higher layer configuration or a combination of a higher layer configuration and a DL control channel. Here, the base station may indicate the unique phase modulation pattern to each of the terminals, thereby randomizing the interference of the UCI channels.

In the case of a communication system operating at a high frequency (e.g., 6 GHz or above), a scenario in which the UCI channel is transmitted to the serving base station while changing a precoding applied to the UCI channel may exist. Since the terminal can apply several precodings, the number of symbols of one UCI channel may be kept small, thereby efficiently using radio resources.

Also, another scenario for delivering different UCI types per UCI channel may exist. The terminal may generate a UCI channel including a channel quality indicator (CQI) and a UCI channel including an HARQ-ACK as different UCI channels and transmit the same to the serving base station. In this case, the UCI channel including the CQI occupies a large number of symbols, but the UCI channel including the HARQ-ACK may occupy a small number of symbols.

Also, another scenario in which a UCI derived from a different usage scenario is transmitted through each UCI channel may exist. The terminal may transmit an HARQ-ACK for an NR eMBB DL data channel in a UCI channel occupying a large number of symbols, and transmit an HARQ-ACK for an NR URLLC DL data channel in a UCI channel occupying a small number of symbols. The above-described scenarios may correspond to a case where one terminal transmits two or more UCI channels having different lengths in one slot.

When generating a UCI channel by assigning priorities to UCI types, the terminal may encode only the UCI type having a high priority and map it to the UCI channel. Also, the terminal may consider not only the UCI types, but also the usage scenarios or logical channel identifications (LCID), so that different priorities may be given to the UCI for the NR eMBB, the UCI for the NR URLLC, and the UCI for the mMTC. Also, in the case of a communication system in which the NR (e.g., 5G communication system) and the LTE (e.g., 4G communication system) are interworking, a different priority may be given to each radio access technology (RAT) as well as the UCI type and the usage scenario. This may be applied to a case where an LTE carrier is configured as a primary cell (PCell) for the terminal and an NR carrier is configured as a secondary cell (SCell) for the terminal in order to perform dual connectivity (LTE-NR dual connectivity). In this way, the UCI generated in the NR carrier may be transmitted using the UCI channel in the LTE carrier. Also, the UCI generated in the NR carrier may be transmitted in the NR carrier, and the UCI generated in the LTE carrier may be transmitted in the LTE carrier. However, since the terminal has limited transmission power, only a part of UCIs may be selected using the priorities among UCIs applicable in this case, and the selected UCI may be transmitted to the serving base station. Also, the terminal may derive appropriate parameters for a power control applied when transmitting the UCI channel(s) according to the priorities of the UCIs.

The coexistence between UCI channels may be applied separately to a case where the UCI channels have the same length and a case where the UCI channels have different lengths. Hereinafter, a UCI channel occupying one or two symbols will be referred to as a short UCI channel, and a UCI channel occupying four or more symbols will be referred to as a long UCI channel.

A case that the first terminal transmits the short UCI channel and the second terminal transmit the long UCI channel in the same slot. Here, the serving base station of the first terminal may be different from the serving base station of the second terminal, and interference may occur when the serving base stations are different from each other.

Since the first terminal can transmit a HARQ-ACK for the URLLC DL data channel on the short UCI channel, the symbol occupied by the short UCI channel in the UL slot may be arbitrarily located within the UL slot.

As an example, in the FDD system, the serving base station may transmit a URLLC DL data channel to the first terminal through a DL slot. The first terminal may receive the URLLC DL data channel from the serving base station, and transmit the short UCI channel to the base station at a HARQ-ACK timing indicated in the URLLC DL control channel. In accordance with the HARQ-ACK timing, the terminal may transmit the UCI channel in arbitrary symbols belonging to the UL slot.

As another example, in the TDD system, the symbols for transmitting the short UCI channel for the URLLC DL data channel of the serving base station may belong to the same slot or a UL region of the next slot. When the DL control channel and the corresponding UCI channel belong to the same slot, in order to secure the time required for processing of the first terminal, the HARQ-ACK timing may be signaled to the first terminal so that the HARQ-ACK timing is located at the ending portion of the corresponding slot. On the other hand, when the UCI channel belongs to the next slot, since the time required for processing of the first terminal is sufficient, the HARQ-ACK timing may be signaled to the first terminal so that the HARQ-ACK timing is located at the beginning of the corresponding slot. Therefore, considering a scenario in which both the TDD and the FDD operate, the short UCI channel transmitted by the first terminal may coexist with the long UCI channel transmitted by the second terminal in the same slot in form of TDM or FDM.

As a separate scenario different from the scenarios described above, there may be a scenario in which a higher priority UCI type is to be further transmitted while a terminal is already transmitting a UCI channel.

For example, there may be a scenario in which the terminal should transmit the UCI for an NR URLLC DL data channel while transmitting the UCI channel for an NR eMBB DL data channel. Such the scenario may correspond to a case in which the lower-priority UCI is included when generating the UCI channel because the terminal does not know in advance the existence of the UCI for the NR URLLC DL data channel. Therefore, three methods may be considered to support such the scenario.

As a first method, a method of mapping the additionally-generated UCI to the UCI channel may be applied. As a second method, a method of generating the additionally-generated UCI as a separate UCI channel and temporally multiplexing two UCI channels (i.e., TDM) may be applied. As a third method, a method of generating the additionally-generated UCI as a separate UCI channel and frequency-multiplexing two UCI channels (i.e., FDM) may be applied.

Hereinafter, the first UCI and the additionally-generated second UCI will be separately described.

As the first method, the terminal may further map the second UCI to the UCI channel. The terminal may map the encoded second UCI to REs included in the UCI channel. Here, the terminal may encode the first UCI, and then map the encoded first UCI to the UCI channel. Thereafter, the terminal may map the encoded second UCI, and a portion of the already mapped first UCI may be punctured. Alternatively, the terminal may map the encoded second UCI to the UCI channel, and then map the encoded first UCI. In this process, the terminal may perform rate matching. Since the second UCI is additionally generated but has a higher priority than the first UCI, the terminal may map the second UCI to REs having a distance equal to or closer to the DM-RS of the UCI channel.

As the second method, the terminal may perform time multiplexing by generating the first UCI and the second UCI as separate UCI channels. The first UCI channel including the first UCI and the second UCI channel including the second UCI may have different lengths. For example, the first UCI channel may have four or more symbols, and the second UCI channel may have one or two symbols. There may be several cases depending on a relative position of the first and second UCI channels. The second UCI channel may be always located only at both ends of the first UCI channel, and the second UCI channel may be transmitted earlier than the first UCI channel. Conversely, the second UCI channel may be transmitted later than the first UCI channel in time. If the terminal can transmit the second UCI channel at any position within the slot, a portion A of the first UCI channel, and a portion B of the second UCI channel and the first UCI channel may be temporally separated. The first UCI channel and the second UCI channel may use different bands (e.g., RB indexes), and may have different bandwidths.

The terminal performs frequency hopping at the first UCI channel and the second UCI channel on the same frequency resource for a predetermined time interval and use different frequency resources for a time interval thereafter. When using different frequency resources, the base station should estimate the uplink channel, so the terminal may separately transmit the DM-RS to the base station. Therefore, such the DM-RS overhead may be considered when performing the time multiplexing between UCI channels. In this case, since the second UCI channel is transmitted in the time multiplexing scheme, the frequency resource used by the first UCI channel may be fully utilized. When the terminal separately transmits the DM-RS resources for the second UCI channel, the serving base station may use both the DM-RS resource for the first UCI channel and the DM-RS resource for the second UCI channel so as to estimate the UL channel with further enhanced quality. Therefore, the terminal may additionally transmit DM-RS resources for the second UCI channel, but may additionally transmit some DM-RS resources in a manner of lowering a density of REs used for the second UCI. On the other hand, even when the terminal does not transmit the DM-RS resources, the serving base station may estimate the UL channel with an appropriate quality. In this case, separate DM-RSs may not be allocated for the second UCI channel or a small number of DM-RSs may be utilized for the second UCI channel. Also, the serving base station may use the DM-RS of the first UCI channel to decode the second UCI included in the second UCI channel.

When the first UCI channel and the second UCI channel have different bandwidths, the terminal may separately transmit the DM-RS of the second UCI channel. Here, the terminal may match the bandwidth of the second UCI channel with the bandwidth of the first UCI channel. Therefore, when time-multiplexing the second UCI channel, the terminal transmits the second UCI channel instead of transmitting a part of the first UCI channel, but the terminal may transmit the DM-RS of the first UCI channel to the base station. For this, the same precoding should be applied to the first UCI channel and the second UCI channel. Therefore, the precoding applied by the terminal when the second UCI channel is transmitted alone and the precoding applied by the terminal to the second UCI channel when transmitting the second UCI channel for the purpose of TDM with the first UCI channel may be different from each other.

As the third method, the terminal may perform frequency multiplexing by generating the first UCI and the second UCI as separate UCI channels. Since the terminal should transmit two UCI channels at the same time, this method cannot be performed by a terminal that is located at the coverage boundary and lacks power. In case in which the serving base station configures the terminal to simultaneously transmit the UL data channel and the UL control channel through a UL signaling or an RRC signaling, and the terminal actually transmits the first UCI channel and the UL data channel at the same slot, it may be difficult that the terminal additionally transmits the second UCI channel. On the other hand, when the terminal transmits only the first UCI channel, the terminal may further transmit the second UCI channel to the base station by FDM.

Activation and Deactivation of Resource Allocation (Activation to Track Channel Variation)

The UCI channel may or may not be frequency-hopped within the UL slot, and the terminal may determine whether to perform frequency hopping in accordance with a higher layer signaling of the serving base station. Here, the terminal may not perform frequency hopping when the UCI channel is composed of only one symbol.

As an example, when frequency hopping is performed, a frequency diversity gain may be obtained, so that the error of demodulating the UCI channel at the serving base station can be greatly reduced. However, since frequency hopping is performed, the number of symbols (RS symbols and UCI symbols) constituting the UCI channel is reduced to about half, so that the performance of the channel estimation may deteriorate and the multi-user gain expressed by the OCCs may be reduced.

As another example, a UCI channel which is not frequency-hopped may not obtain a frequency diversity gain, although the channel estimation performance increases and multi-user gain increases. Therefore, the reception quality of the UCI channel obtainable by the serving base station may be affected by fading characteristics of the UL channel.

If the fading of the UL channel between the terminal and the serving base station is good, the serving base station may perform a higher layer signaling so that the UCI channel does not perform frequency hopping. On the other hand, if the fading of the UL channel between the terminal and the serving base station is bad (i.e., deep fading), the serving base station may perform a higher layer signaling so that the UCI channel performs frequency hopping.

The serving base station may track the state of the UL channel through the DM-RS of the SRS, the DM-RS of the UL control channel, or the DM-RS of the UL data channel of the terminal. Therefore, when the fading of the UL channel is bad, since the serving base station knows the UL CSI in advance, the terminal may be configured not to use the corresponding UL frequency resources when transmitting the UCI channel.

When the resource through which the UCI channel is transmitted is indicated by the DL control channel, the terminal may transmit the UCI channel using a resource corresponding to the index received from the serving base station. Such the resource may include at least one of a frequency resource, an RB index, a code resource, a time resource, and a symbol index used by the UCI channel.

The serving base station may inform the terminal of a BWP or a subband by the DL control channel (PDCCH). In the following, embodiments will be described without distinguishing between a BWP and a subband. Here, it may include not only information on the DL BWP but also information on the UL BWP in which the terminal should transmit the UCI channel. Therefore, the DL control channel received by the terminal may include not only the scheduling information for the DL data channel but also the index of the UL BWP. Since the serving base station includes the index of the DL BWP within the scheduling information for the DL data channel, the terminal may know both of the index of the DL BWP and the index of the UL BWP. The serving base station may include the index of the DL BWP and the index of the UL BWP as independent fields of the DL control channel, respectively. However, the indexes of the BWPs may be expressed as a combination, and an ordered pair of the index of the DL BWP and the index of the UL BWP may be indicated by an integrated index. This approach has the advantage of reducing the amount of field occupied in the DL control channel. For this, the serving base station may define the ordered pairs of the BWPs, which the integrated indexes are to potentially indicate, by using the higher layer signaling. Then, the terminal may receive the integrated index indicated by the DL control channel, and identify the DL BWP and the UL BWP.

In order to adjust the integrated index and the frequency resources for transmitting the UCI channel, the serving base station may appropriately adjust the value of the field in the DL control channel. Accordingly, the terminal may perform demodulation, and use the frequency selectivity characteristics without performing frequency hopping.

As an example, when the serving base station transmits the DL data to the terminal and receives the HARQ-ACK, the method described above may be applied. The above-described method may also be applicable to a case where the terminal transmits another other UCI other than the HARQ-ACK by multiplexing them into the same UCI channel. Such the type of UCI may correspond to a periodically-generated UCI (e.g., CSI report, L1 RSRP, SR).

When the serving base station indicates resources for transmitting the UCI channel through a higher layer signaling, the serving base station cannot dynamically select resources used for the UCI channel. In order to overcome such the disadvantage, the serving base station may configure a plurality of UCI channels to the terminal through a higher layer signaling, and then select one UCI channel using a MAC signaling or a DL control channel. Here, the region of the resources for the UCI channel may be distributed over several frequency resources. The serving base station may select the best frequency resource among the plurality of frequency resources using the UL CSI, and instruct the terminal to transmit the UCI channel using the selected frequency resource. The specific signaling scheme may be applied differently for each UCI. The terminal knows the frequency resource to be used when transmitting the UCI channel, and may use it to transmit the UCI channel.

As an example, when applied to the periodically-generated UCI (e.g., CSI report, L1 RSRP, SR), the serving base station may select one UCI channel among a plurality of UCI channel resources configured for the terminal according to the UL CSI. Then, the serving base station may transmit the selected UCI channel to the terminal by using a MAC signaling or a DL control channel. After a predetermined time that the serving base station and the terminal know lapses, the terminal may recognize resources (frequency, code, time) of the UCI channel to be applied at the time of transmitting the UCI channel. The terminal may transmit the UCI channel using these resources. When the serving base station determines that the UL CSI has changed, the serving base station may select another UCI channel resource, and indicate it to the terminal by using a MAC signaling or a DL control channel FIG. 42 is a diagram illustrating an example of a UCI transmission method according to the present invention.

Figure 42:
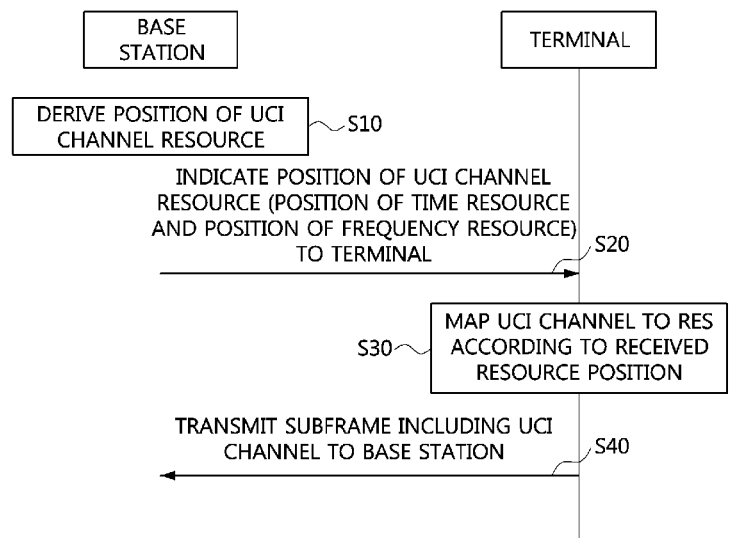
FIG. 42 is a diagram illustrating an example of a UCI transmission method according to the present invention.

Referring to FIG. 42, a base station may derive a position (i.e., frequency resource position and time resource position) of a resource for transmitting a UCI channel (S10). The time resource position may indicate one or more UL sub-slots, and the corresponding sub-slot may include a last symbol in a UL slot, or may be located in the middle of the UL slot. Here, the base station may derive the frequency resource position of the UCI channel by using a TC value, a bandwidth configuration variable (BandwidthConfig), a bandwidth variable (Bandwidth), a frequency hopping bandwidth variable (HoppingBandwidth), frequency domain position information, or the like.

Then, the base station may indicate the position of the UCI channel resource to the terminal (S20). That is, the base station may transmit information on the position of the resource for transmitting the UCI channel to the terminal. As an example, the base station may transmit the information on the position of the resource for transmitting the UCI channel to the terminal using a DL control channel. As another example, the base station may transmit the information on the position of the resource for transmitting the UCI channel to the terminal as an RRC parameter. As another example, when the base station transmits a DL data channel to the terminal, the base station may indicate the frequency resource of the UCI channel to the terminal using a bit field included in the DL control channel. The base station may measure the UL received power of the terminal to control the terminal to have an appropriate transmission power, and indicate to the terminal the number of sub-slots for transmitting the UCI channel through a higher layer signaling.

Then, the terminal may map the UCI channel to the REs based on the information on the position of the resource for the UCI channel, which was received from the base station (S30). As an example, the terminal may map the UCI channel to the REs in order of time resources, and then map the UCI channel to the REs in order of frequency resources. As another example, the terminal may map the UCI channel to the REs in order of frequency resources, and then map the UCI channel to the REs in order of time resources.

Here, the UCI channel may include an RS. When the UCI channel is configured with a single symbol, REs of the UCI channel and REs of the RS may be mapped using FDM.

The terminal may then arrange the UCI channel in at least one symbol and transmit a subframe containing the at least one symbol to the base station. Accordingly, the terminal may transmit the UCI channel to the base station (S40).

Figure 43:
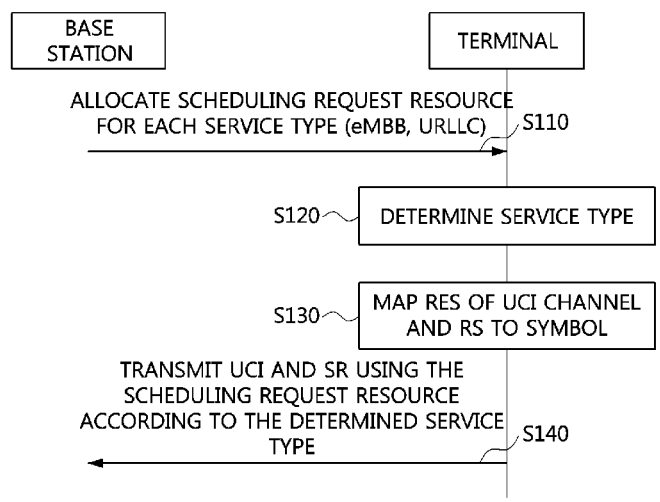
FIG. 43 is a diagram illustrating another example of a UCI transmission method according to the present invention.

FIG. 43 is a diagram illustrating another example of a UCI transmission method according to the present invention.

Referring to FIG. 43, the base station may recognize a service type (e.g., eMBB or URLLC) requested by the terminal, and transmit a scheduling grant to the terminal. The base station may allocate an SR resource to each terminal in accordance with the service type (e.g., eMBB or URLLC) so that the terminal can transmit an SR for each service type (S110). Here, the base station may configure different periods, different TTIs, or different parameters (numerology or subcarrier spacing).

Specifically, the base station may allocate an SR resource for providing the eMBB service to the terminal. Also, the base station may allocate an SR resource for providing the URLLC service to the terminal. Also, the base station may allocate an SR resource for providing the mMTC service to the terminal.

Then, the terminal may determine a service type desired to be provided among the plurality of service types (e.g., eMBB, URLLC, and mMTC) (S120). That is, the terminal may select a service type (e.g., URLLC) to be provided among the eMBB, URLLC, and mMTC service types.

Then, the terminal may map the REs of the UCI channel of the selected URLLC service and the REs of the RS to the symbol (S130). Here, the UCI channel of 1 bit or 2 bits or more for the URLLC service may be mapped to the symbol. Also, the UCI channel of 1 bit or 2 bits or more for the eMBB service may be mapped to the symbol. Also, the UCI channel of 1 bit or 2 bits or more for the mMTC service may be mapped to the symbol.

Then, the terminal may transmit the UCI and the SR to the base station using the SR resource according to the service type (S140). Here, the terminal may select an SR resource of a service (e.g., URLLC) desired to be provided among the SR resources received from the base station, and transmit the UCI channel to the base station. The base station may identify the service to be provided to the terminal based on the SR received from the terminal.

Meanwhile, the base station may configure an SR resource to the terminal regardless of the service type, and the terminal may inform a service desired to be provided to the base station by expressing the SR in several bits. As an example, the terminal may express an SR for the uplink eMBB, an SR for the uplink URLLC, and an SR for the uplink mMTC by using 1 bit or 2 bits or more.

As another example, the base station may configure an SR resource for the URLLC service to the terminal, and the terminal may generate an SR by expressing the amount of uplink buffer in several bits. For example, the terminal may classify the amount of URLLC traffic according to its size into several steps, and map the information on the amount of URLLC traffic to 2-bit information to generate the SR.

In this case, when the terminal transmits only the SR to the base station, it is not necessary to transmit the UCI. Thus, the UCI channel including only the SR may be transmitted to the base station without including the UCI. Such the UCI channel may be composed of one or more symbols, and the base station may configure the terminal to transmit the SRS in the same subband as the subband through which the UCI channel is transmitted. The base station may configure radio resources for terminals so that a first terminal transmits the UCI channel to the base station and a second terminal transmits the SRS to the base station. The first terminal may map the REs of the RS to the UCI channel. Also, the first terminal may map the REs of the RS and the REs of the ZP RS to the UCI channel Using the UCI transmission method and apparatus according to embodiments of the present invention, the terminal can vary time resources for transmitting the UCI, and the terminal can transmit the UCI by using a small amount of time resources. Also, the terminal can map HARQ-ACK bits to REs without using RSs when transmitting the UCI channel, thereby reducing detection errors of the UCI channel at the base station.

Using the UCI transmission method and apparatus according to embodiments of the present invention, the terminal can use RSs and allow a first symbol and a second symbol to have different subcarrier index sets, thereby enhancing detection performance of the UCI channel at the base station. Also, the base station can configure an SRS to be transmitted in the same subband with a UCI channel carrying an SR, and prevent collisions between the UCI channel and the SRS by applying a transmission comb (TC) to the UCI channel, when a first terminal transmits the UCI channel and a second terminal transmits the SRS. Also, the terminal can repeatedly transmit an SRS by using the same resource (frequency and code) during two symbols to the base station, thereby enhancing channel estimation performance of the base station. Also, the terminal can repeatedly transmit an SRS by using different resources (frequency and code) during two symbols, thereby reducing a time required for the base station to obtain the CSI.

Using the UCI transmission method and apparatus according to embodiments of the present invention, uplink management can be performed between the terminal and the base station by applying an SRS occasion, thereby performing the uplink management without uplink disconnection even in an environment having a high blockage probability.

Using the UCI transmission method and apparatus according to embodiments of the present invention, the base station may allocate frequency resources to be used by terminals from edges, and the terminal can transmit an uplink data channel in a DFT-s-OFDM waveform, thereby allowing a lot of data to be transmitted using a wide bandwidth. Also, the terminal located near from the base station can transmit an SRS in a wide band, thereby reducing a time required for the base station to obtain the CSI. Also, the base station can make center frequencies of terminals coincide with each other, and the terminal can transmit an uplink data channel in a CP-OFDM waveform, thereby lowering Peak to Average Power Ratio (PAPR).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a communication system, the operation method comprising:
receiving a higher layer message including first configuration information on a first physical uplink control channel (PUCCH)resource set and second configuration information on a second PUCCH resource set, the first configuration information including information of a first PUCCH format and information on a physical resource block (PRB) related to the first PUCCH format, the second configuration information including information of a second PUCCH format and information on a PRB related to the second PUCCH format, the information of the first PUCCH format indicating first time resources for transmitting the first PUCCH format, the information of the second PUCCH format indicating second time resources for transmitting the second PUCCH format, and the first and second time resources being independently configured;
receiving downlink control information (DCI) indicating the first PUCCH resource set among the first and second PUCCH resource sets; and
transmitting the first PUCCH format using the first time resources and frequency resources recording to the information on the PRB related to the first PUCCH format,
wherein the information on the PRB related to the first PUCCH format indicates a starting index of the PRB for the first PUCCH format and a hop index of a hopping PRB for the first PUCCH format, and
wherein, when a frequency hopping operation is performed, the PRB for the first PUCCH format is hopped from a first hop PRB corresponding to the starting index to a second hop PRB corresponding to the hop index.

2. The operation method of claim 1, wherein the information of the first PUCCH format further indicated a number of symbols used for transmitting the first PUCCH format.

3. The operation method of claim 1, wherein the first configuration information further includes hopping information indicating that the frequency hopping operation is performed.

4. The operation method of claim 1, wherein the first time resources of the first PUCCH format are not limited to a last symbol of a slot including the first time resources.

5. The operation method of claim 1, wherein one or more of a sounding reference signal (SRS), a physical uplink shared channel (PUSCH), and another PUCCH format is transmitted after an ending symbol of the first PUCCH format.

6. The operation method of claim 1, wherein the starting index of the PRB and the hop index of the hopping PRB are independently configured within an active bandwidth part.

* * * * *